(12) United States Patent
Raghavan et al.

(10) Patent No.: US 11,728,855 B2
(45) Date of Patent: Aug. 15, 2023

(54) SIGNAL BLOCKAGE MITIGATION TECHNIQUES IN WIRELESS COMMUNICATIONS

(71) Applicant: QUALCOMM Incorporated, San Diego, CA (US)

(72) Inventors: Vasanthan Raghavan, West Windsor Township, NJ (US); Mohammad Ali Tassoudji, San Diego, CA (US); Raghu Narayan Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/671,922

(22) Filed: Feb. 15, 2022

(65) Prior Publication Data

US 2022/0294502 A1 Sep. 15, 2022

Related U.S. Application Data

(60) Provisional application No. 63/159,875, filed on Mar. 11, 2021.

(51) Int. Cl.
*H04B 7/0456* (2017.01)
*H04B 7/08* (2006.01)
(Continued)

(52) U.S. Cl.
CPC ......... *H04B 7/0456* (2013.01); *H04B 7/0842* (2013.01); *H04B 17/103* (2015.01); *H04B 17/13* (2015.01)

(58) Field of Classification Search
CPC .. H04B 7/0456; H04B 7/0842; H04B 17/103; H04B 17/13; H04B 7/0617; H04B 7/086; H04B 17/318
See application file for complete search history.

(56) References Cited

U.S. PATENT DOCUMENTS

2012/0040629 A1 2/2012 Li et al.
2015/0358129 A1 12/2015 Ryu et al.
(Continued)

FOREIGN PATENT DOCUMENTS

WO WO-2020075978 A1 4/2020

OTHER PUBLICATIONS

International Search Report and Written Opinion—PCT/US2022/016562—ISA/EPO—dated Jun. 1, 2022.

*Primary Examiner* — Vineeta S Panwalkar
(74) *Attorney, Agent, or Firm* — Dalei Dong; Holland & Hart LLP

(57) ABSTRACT

Methods, systems, and devices for wireless communications are described for mitigation of blockages in wireless signals between wireless devices. A UE may detect that a blockage is present (e.g., a hand blockage), such as by detecting that a received signal strength from a transmitting device (e.g., a base station or access network entity) has dropped by greater than a threshold value. Based on the blockage detection, the UE may measure an amplitude of one or more reference signals at one or more antenna elements of multiple antenna elements. The UE may also measure one or more reference signals for one or more phase shifter values that are applied to the multiple antenna elements. The UE may determine a set of amplitude weightings, and a set of phase weightings, for the multiple antenna elements based on the measuring, and apply the sets of weightings for communications with the transmitting device.

30 Claims, 12 Drawing Sheets

(51) Int. Cl.
   *H04B 17/13* (2015.01)
   *H04B 17/10* (2015.01)

(56) References Cited

U.S. PATENT DOCUMENTS

| 2017/0085303 | A1  | 3/2017  | Chen et al. |
| 2019/0104421 | A1* | 4/2019  | Urzhumov ......... H01Q 15/0086 |
| 2021/0351835 | A1  | 11/2021 | Woo et al. |

* cited by examiner

SIGNAL BLOCKAGE MITIGATION TECHNIQUES IN WIRELESS COMMUNICATIONS

CROSS REFERENCE

The present application for patent claims the benefit of U.S. Provisional Patent Application No. 63/159,875 by RAGHAVAN et al., entitled "SIGNAL BLOCKAGE MITIGATION TECHNIQUES IN WIRELESS COMMUNICATIONS," filed Mar. 11, 2021, assigned to the assignee hereof, and expressly incorporated by reference herein.

FIELD OF TECHNOLOGY

The following relates to wireless communications, including signal blockage mitigation techniques in wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Wireless communication systems may operate in multiple different frequency ranges, some of which may be relatively susceptible to blockages by nearby objects or portions of a user's body (e.g., hand, shoulders, face, etc.). For example, in millimeter wave (mmW) frequency ranges, e.g., 26 GHz, 28 GHz, 39 GHz, 57-71 GHz, etc., wireless communications may be associated with increased signal attenuation (e.g., path loss, penetration loss, blockage loss) and increased susceptibility to blockages. Signal processing techniques, such as beamforming, may be used by a transmitting device (e.g., a TRxP) to coherently combine energy and overcome the path losses, and a receiving device (e.g., a UE) may use beamforming techniques to configure antenna elements so that transmissions are received in a directional manner. Techniques to improve beamforming and mitigate attenuation of signals may be desired for achieving higher reliability and throughput in wireless communication systems.

SUMMARY

The described techniques relate to improved methods, systems, devices, and apparatuses that support signal blockage mitigation techniques in wireless communications. In accordance with various aspects, described techniques provide for determination of a set of amplitude weightings and a set of phase weightings that may be applied to an antenna array in order to mitigate blockage associated with the antenna array. In some cases, a user equipment (UE) may detect that a blockage is present (e.g., a hand blockage), such as by detecting that a received signal strength from a transmitting device (e.g., a base station) has dropped by greater than a threshold value. Based on the blockage detection, the UE may measure an amplitude of one or more reference signals at one or more antenna elements of multiple antenna elements (e.g., at each antenna element of an antenna array). The UE may also measure one or more reference signals for one or more phase shifter values that are applied to the multiple antenna elements (e.g., over a phase shifter search space). The UE may determine a set of amplitude weightings, and a set of phase weightings, for the multiple antenna elements based on the measuring, and apply the sets of weightings for receiving communications from the transmitting device. These sets of weightings can also be used for uplink transmissions using beam correspondence principles. The weightings for both amplitude and phase may provide for enhanced mitigation of the blockage relative to weightings that are based only on phase measurements.

A method for wireless communication at a user equipment (UE) is described. The method may include measuring, for one or more antenna elements of a set of multiple antenna elements at the UE, an amplitude of one or more reference signals received from an access network entity, measuring a received power of the one or more reference signals for one or more phase shifter values of a set of multiple phase shifter values applied to the set of multiple antenna elements, applying a set of amplitude weightings and a set of phase weightings to the set of multiple antenna elements, where the set of amplitude weightings are based on the measured amplitudes and the set of phase weightings are based on the measured received powers, and receiving one or more downlink transmissions from the access network entity based on the set of amplitude weightings and the set of phase weightings applied to the set of multiple antenna elements.

An apparatus for wireless communication at a UE is described. The apparatus may include a processor, memory coupled with the processor, and instructions stored in the memory. The instructions may be executable by the processor to cause the apparatus to measure, for one or more antenna elements of a set of multiple antenna elements at the UE, an amplitude of one or more reference signals received from an access network entity, measure a received power of the one or more reference signals for one or more phase shifter values of a set of multiple phase shifter values applied to the set of multiple antenna elements, apply a set of amplitude weightings and a set of phase weightings to the set of multiple antenna elements, where the set of amplitude weightings are based on the measured amplitudes and the set of phase weightings are based on the measured received powers, and receive one or more downlink transmissions from the access network entity based on the set of amplitude weightings and the set of phase weightings applied to the set of multiple antenna elements.

Another apparatus for wireless communication at a UE is described. The apparatus may include means for measuring, for one or more antenna elements of a set of multiple antenna elements at the UE, an amplitude of one or more reference signals received from an access network entity, means for measuring a received power of the one or more reference signals for one or more phase shifter values of a set of multiple phase shifter values applied to the set of multiple antenna elements, means for applying a set of amplitude weightings and a set of phase weightings to the set of multiple antenna elements, where the set of amplitude weightings are based on the measured amplitudes and the set of phase weightings are based on the measured received powers, and means for receiving one or more downlink transmissions from the access network entity based on the set of amplitude weightings and the set of phase weightings applied to the set of multiple antenna elements.

A non-transitory computer-readable medium storing code for wireless communication at a UE is described. The code may include instructions executable by a processor to measure, for one or more antenna elements of a set of multiple antenna elements at the UE, an amplitude of one or more reference signals received from an access network entity, measure a received power of the one or more reference signals for one or more phase shifter values of a set of multiple phase shifter values applied to the set of multiple antenna elements, apply a set of amplitude weightings and a set of phase weightings to the set of multiple antenna elements, where the set of amplitude weightings are based on the measured amplitudes and the set of phase weightings are based on the measured received powers, and receive one or more downlink transmissions from the access network entity based on the set of amplitude weightings and the set of phase weightings applied to the set of multiple antenna elements.

Some examples of the method, apparatuses, and non-transitory computer-readable medium described herein may further include operations, features, means, or instructions for initiating a procedure to obtain the set of amplitude weightings and the set of phase weightings based on a detection of a signal strength reduction at the UE that exceeds a threshold value. In some examples of the method, apparatuses, and non-transitory computer-readable medium described herein, the detection of the signal strength reduction that exceeds the threshold value may be based on periodic reference signal measurements of the UE, and where the threshold value corresponds to a strength reduction that indicates a hand blockage of one or more antenna elements of the set of multiple antenna elements.

In some examples of the method, apparatuses, and non-transitory computer-readable medium described herein, the set of phase weightings may be determined based on one or more aperiodic reference signals transmitted by the access network entity. In some examples of the method, apparatuses, and non-transitory computer-readable medium described herein, the one or more aperiodic reference signals de-randomize phase distortions induced by a blockage of one or more antenna elements of the set of multiple antenna elements.

In some examples of the method, apparatuses, and non-transitory computer-readable medium described herein, the amplitude of the one or more reference signals may be measured for one antenna element at a time in an antenna array that includes the set of multiple antenna elements. In some examples of the method, apparatuses, and non-transitory computer-readable medium described herein, the measured amplitudes and the measured received powers correspond to reference signal received powers (RSRPs) of the one or more reference signals.

In some examples of the method, apparatuses, and non-transitory computer-readable medium described herein, the applying the set of amplitude weightings and the set of phase weightings may include operations, features, means, or instructions for applying a matrix of products of amplitude weightings and phase weightings to signals of each antenna, where the matrix may be weighted based on a summation of the measured amplitudes. In some examples of the method, apparatuses, and non-transitory computer-readable medium described herein, the amplitude weighting associated with each antenna element may be applied to a corresponding phase weighting as an amplitude that is a square root of a reference signal received power of the one or more reference signals that is measured at the corresponding antenna element. In some examples of the method, apparatuses, and non-transitory computer-readable medium described herein, the matrix may be weighted by an inverse of a square root of a summation of each of the measured RSRPs to provide unit energy beamforming.

In some examples of the method, apparatuses, and non-transitory computer-readable medium described herein, the set of multiple phase shifter values may be determined based on a B-bit phase shifter search and a number of phase factors that is based on a number of antenna elements of the set of multiple antenna elements. In some examples of the method, apparatuses, and non-transitory computer-readable medium described herein, the number of phase factors may be set to one less than the number of antenna elements.

DETAILED DESCRIPTION

Figure 1:
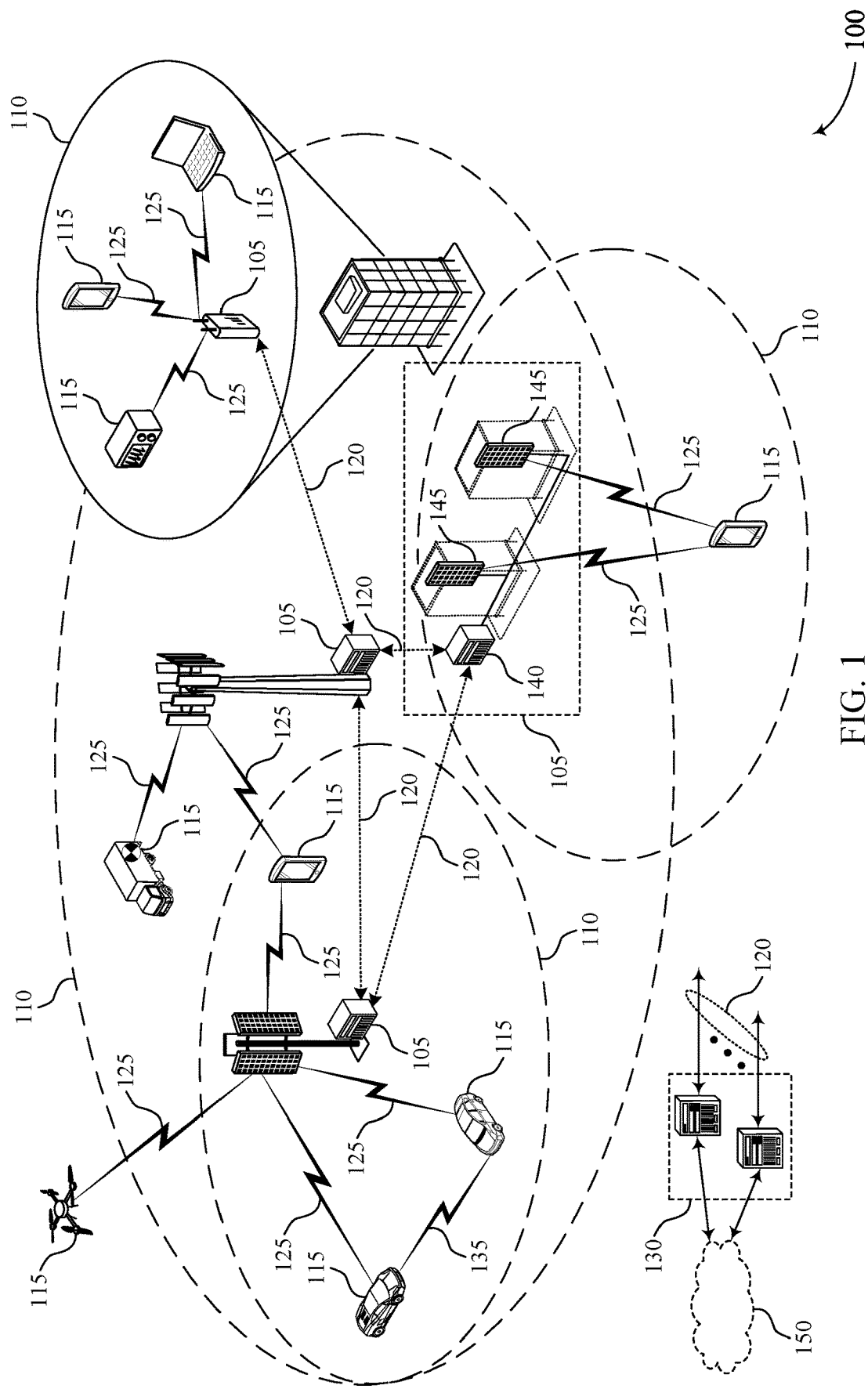
FIG. 1 illustrates an example of a wireless communications system that supports signal blockage mitigation techniques in wireless communications in accordance with aspects of the present disclosure.

Wireless communication systems may include transmitting and receiving devices (e.g., base stations, user equipment (UE) devices, remote radio heads, etc.) that use multiple antennas for communications. For example, a UE may include multiple different antenna panels/sub-arrays that each include multiple antenna elements that may have an antenna spacing that is based on an operating frequency range of the antenna sub-array. In cases where one or more antenna sub-arrays may be configured for relatively high frequency ranges, such as millimeter wave (mmW) frequency ranges, e.g., 26 GHz, 28 GHz, 39 GHz, 57-71 GHz, etc., signal processing techniques (e.g., beamforming) may be used to overcome path loss. For example, a transmitting device (e.g., a transmission and reception point (TRxP), base station, or UE) may coherently combine transmission energy over one or more antenna elements, and overcome the path losses at an operating frequency. In other examples, a receiving device (e.g., a UE or a base station) may use beamforming techniques to configure antenna elements for directional signal reception. Communications at mmW frequencies may also be more susceptible to blockages relative to sub-6 GHz frequencies, such as by an object or portions of a user's body that may be located in the direction of a steered beam path and that substantially attenuates the beam. Further, spacing of antenna elements may be relatively close, which may make an antenna sub-array relatively susceptible to hand blockages where one or more fingers of a user may block multiple antenna elements. Techniques as discussed herein provide for mitigation of blockages at a UE, which may help to enhance communication reliability and efficiency.

In some cases, a UE and base station may determine beamforming parameters based on codebook-based directional beamforming procedures in which one or more candidate beams are identified for use in communications. In order to address memory and complexity constraints, some systems implement a fixed codebook (since the codebook is fixed, it can also be denoted as a static codebook) that may be stored in a memory of a radio frequency integrated circuit (RFIC) at both the base station and UE sides, and beam training may be performed over this fixed codebook (e.g., using a hierarchical beam training, such as established P-1, P-2, and P-3 procedures defined by the $3^{rd}$ Generation Partnership Project (3GPP)). In some situations, adaptive or dynamic beam weights beyond the fixed beam weights of the static codebook may be beneficial. In accordance with various aspects discussed herein, a UE, base station, or both, may apply adaptive or dynamic beam weights beyond a set of codebook beam weights in order to mitigate a blockage condition, such as a hand blockage, at the UE.

In some cases, the UE may detect that a blockage is present (e.g., a hand blockage), such as by detecting that a received signal strength from a transmitting device (e.g., a base station or an access network entity) has dropped by greater than a threshold value. Based on the blockage detection, the UE may measure an amplitude of one or more reference signals at one or more antenna elements of multiple antenna elements (e.g., at each antenna element of an antenna array). The UE may also measure one or more reference signals for one or more phase shifter values that are applied to the multiple antenna elements (e.g., over a phase shifter search space). The UE may determine a set of amplitude weightings, and a set of phase weightings, for the multiple antenna elements based on the measuring, and apply the sets of weightings for receiving communications from the transmitting device. The weightings for both amplitude and phase may provide for enhanced mitigation of the blockage relative to weightings that are based only on phase measurements.

Aspects of the disclosure are initially described in the context of wireless communications systems. Aspects of the disclosure are further illustrated by and described with reference to examples of antenna attenuations for certain blockages, flow charts, system architectures, apparatus diagrams, system diagrams, and flowcharts that relate to signal blockage mitigation techniques in wireless communications.

FIG. 1 illustrates an example of a wireless communications system 100 that supports signal blockage mitigation techniques in wireless communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions.

The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, the UE 115 may detect that a blockage is present (e.g., a hand blockage), such as by detecting that a received signal strength from a base station 105 has dropped by greater than a threshold value. Based on the blockage detection, the UE 115 may determine a set of amplitude weightings, and a set of phase weightings, for multiple antenna elements based on amplitude measurements of one or more reference signals at one or more antenna elements (e.g., at each antenna element of an antenna array) and phase measurements of the one or more reference signals at the one or more antenna elements. The set of amplitude weightings and the set of phase weightings may be applied, in addition to a static codebook set of antenna weightings, to help to mitigate the blockage and enhance communications reliability between the UE 115 and base station 105.

Figure 2:
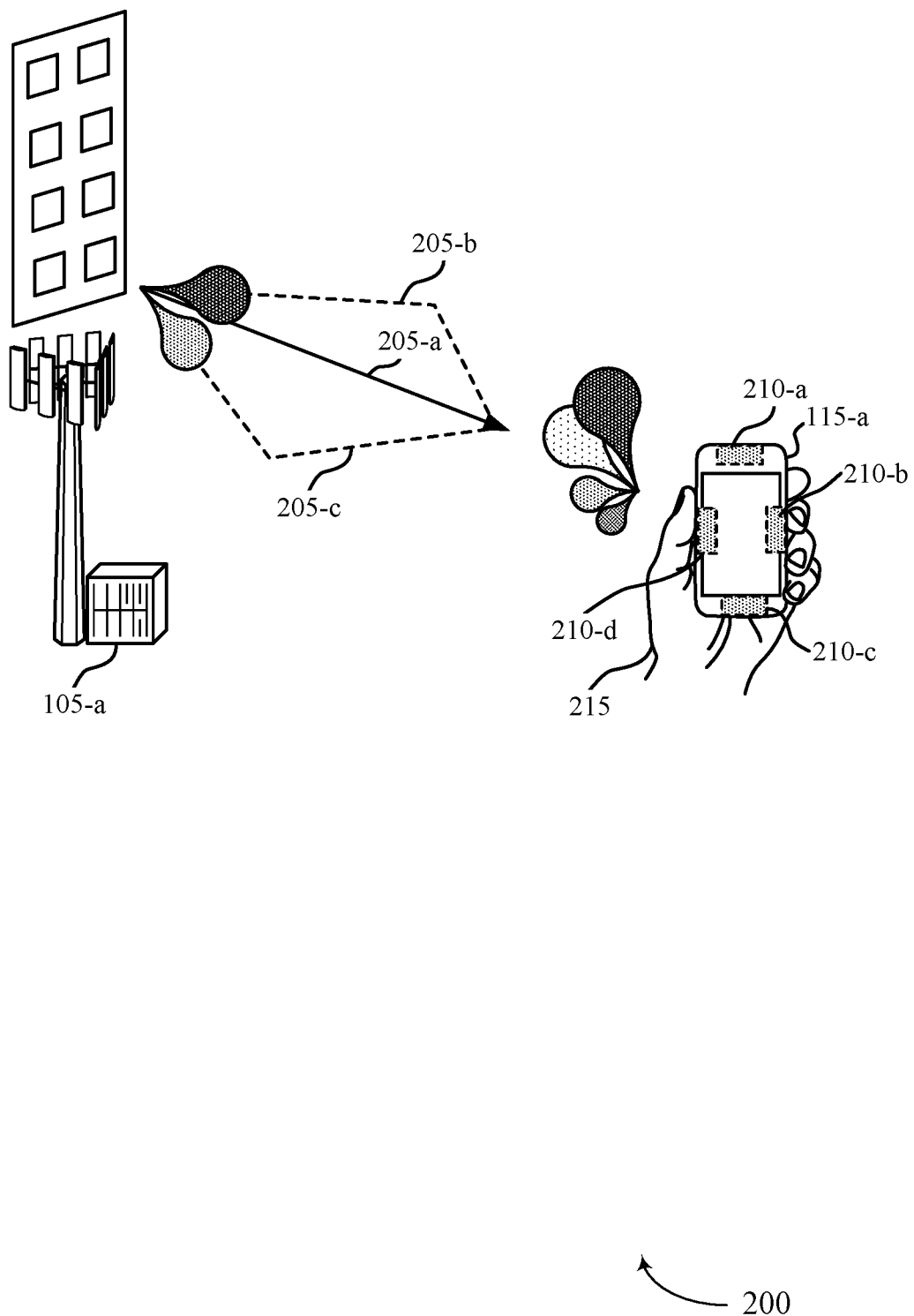
FIG. 2 illustrates an example of a portion of a wireless communications system that supports signal blockage mitigation techniques in wireless communications in accordance with aspects of the present disclosure.

FIG. 2 illustrates an example of a wireless communications system 200 that supports signal blockage mitigation techniques in wireless communications in accordance with aspects of the present disclosure. Wireless communications system 200 may include a UE 115-a and a base station 105-a, which may be examples of the corresponding devices described with reference to FIG. 1.

The UE 115-a may support a communication link 205 (or multiple links) with base station 105-a. The communication link 205 may have multiple transmission paths such that a first component of communication link 205-a has a direct or line-of-sight (LOS) path, and a second component of communication link 205-b and a third component of communication link 205-c may have indirect or non-LOS path. Further, the UE 115-a may support antenna panels containing multiple antenna elements, which may include a first sub-array 210-a, a second sub-array 210-b, a third sub-array 210-c, and a fourth sub-array 210-d. Each sub-array may include multiple antenna elements (e.g., a 4×1 antenna array may include four antenna elements arranged in a single row, a 4×2 antenna array may include eight antenna elements arranged as two rows with four antenna elements each, etc.).

Figure 3A:
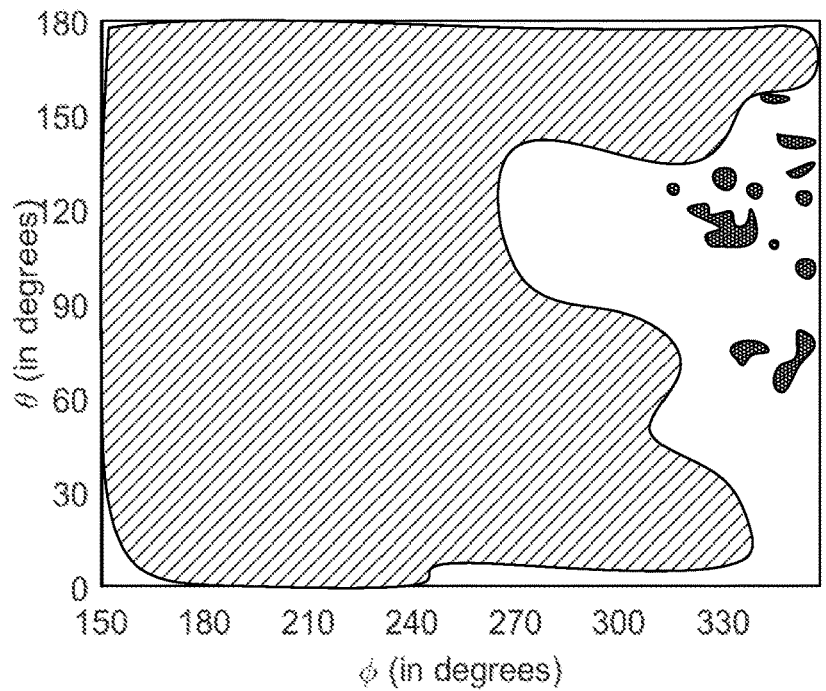
FIGS. 3A and 3B illustrate examples of amplitude perturbations from signal blockage in wireless communications in accordance with aspects of the present disclosure.
Figure 3B:
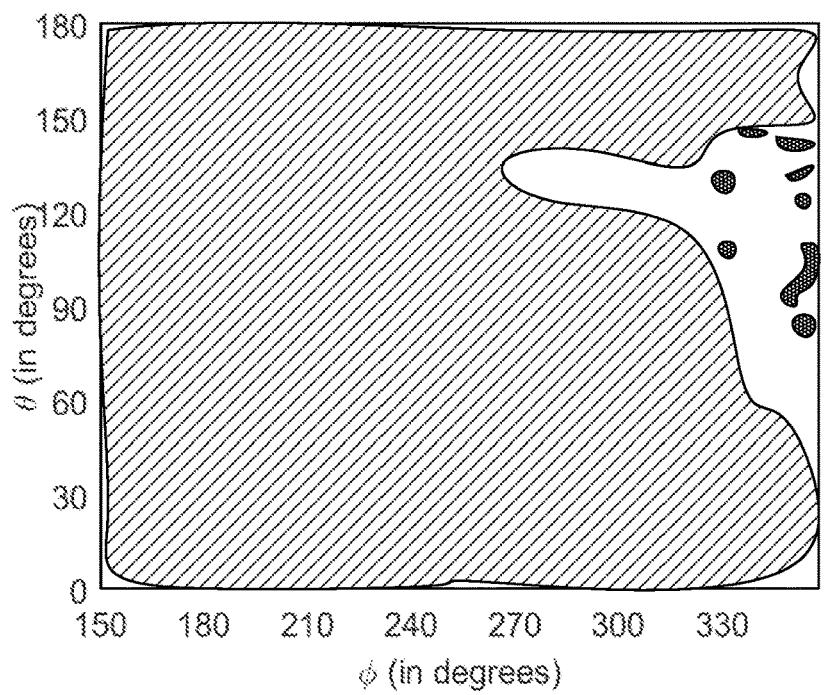

In this example, a user's hand 215 may be placed such that one or more sub-arrays 210 may be blocked. In the example of FIG. 2, such a blockage may result in one or more coverage regions associated with the antenna array being substantially attenuated. Examples of signal attenuation for exemplary blockages of one and two fingers are illustrated in FIGS. 3A and 3B. In the event that the beam that is used is impacted by the blockage, substantial signal attenuation may be experienced that may result in less reliable communications. In various aspects of the present disclosure, mitigation of a blockage may be performed by the UE 115-a in a dynamic manner, such that static codebook weightings of a codebook (e.g., generated from a beam training procedure) may be updated with dynamic weightings that help mitigate the blockage.

In some cases, the UE 115-a may perform a search over amplitude and phase shifter values for mitigating the blockage. In some cases, for the amplitude values, the UE 115-a may measure a reference signal received power (RSRP) of a reference signal and thereby estimate the amplitude of the signal seen by one (or more) antenna elements. When measuring amplitude the UE 115-a may determine the square root of the RSRP that is observed at a single antenna element (e.g., pseudo-omni beam used in initial link acquisition). In some cases, the amplitude RSRP measurements may be based on CSI reference signal (CSI-RS) transmissions of the base station 105-a, using established CSI-RS resources. When performing the phase shifter measurements, the UE 115-a may perform a search over a space of phase shifters. In some cases, each antenna element of a sub-array 210 may be sampled with multiple different phase shifts and multiple phase factors (e.g., combinations of different phase shifts at different antenna elements), such that a number of combinations of phases for the antenna elements is tested (e.g., a two-bit phase shifter search per antenna element over three phase factors may result in $64=(2^2)^3$ possible beam weights).

For example, the fourth sub-array 210-d may be determined to have a blockage (e.g., due to the thumb of the user's hand 215 blocking one or more antenna elements). The fourth sub-array 210-d may be a 4×1 array, and the amplitude measurement may measure $RSRP_i$ (where i=1, 2, 3, 4) indicating the observed RSRP using beam weight vectors $w_i$ where $w_1=[1\ 0\ 0\ 0]$, $w_2=[0\ 1\ 0\ 0]$, $w_3=[0\ 0\ 1\ 0]$, and $w_4=[0\ 0\ 0\ 1]$. Based on the amplitude measurements, amplitude weightings may be generated for hand blockage mitigation according to:

$$w = \frac{1}{\sqrt{\sum_{i=1}^{4} RSRP_i}} \cdot \begin{bmatrix} \sqrt{RSRP_1} \cdot e^{j\phi_1} \\ \sqrt{RSRP_2} \cdot e^{j\phi_2} \\ \sqrt{RSRP_3} \cdot e^{j\phi_3} \\ \sqrt{RSRP_4} \cdot e^{j\phi_4} \end{bmatrix}$$

where the square root of the measured RSRP is used as a proxy for amplitude and, based on the RSRP being a power measurement, and the matrix is weighted by an inverse of a square root of a summation of each of the measured RSRPs to provide unit energy beamforming.

Such a technique provides an estimate of a channel at the UE 115-a, where the effective channel seen by the 4×1 sub-array 210 is $[h_1\ h_2\ h_3\ h_4]$, and optimal beam weights to be used may be maximum ratio combining (MRC) beam weights corresponding to $[h_1\ h_2\ h_3\ h_4]$. In cases where a phase shifter search alone is used for blockage mitigation, only the phases of $[h_1\ h_2\ h_3\ h_4]$ are incorporated, whereas by using both amplitude and the phase shifter search may provide a better estimation or approximation of the effective channel $[h_1\ h_2\ h_3\ h_4]$. For the phase shifter search, multiple phase settings per antenna element may be used, where the number of phase settings for each antenna element may be set based on a B-bit phase shifter (e.g. a 2-bit phase shifter that results in four phases per antenna element, or a 3-bit phase shifter that results in eight phases per antenna element). The phase shifter search may also be dependent on a number of phase factors, which may be based on a number of antenna elements. For example, for a 4×1 sub-array 210, four antenna elements with the B-bit phase shifter may provide four phase factors. However, since only relative phase measurements are used, the search can be reduced to only 3 phase factors with $\varphi_1$ set to 0 (e.g., the phase factors may be determined based on a number of antenna elements minus one).

In some cases, implementing techniques as discussed herein may provide beamforming gains that are higher than techniques that use only phase searching to determine matrix weightings that are applied to an antenna array. For example, if four discrete Fourier transform (DFT) beams are used in a 4×1 sub-array 210, different dynamic beam search codebooks may be considered for a 2-bit phase shifter search or a 3-bit phase shifter search (e.g., the value of B of the B-bit phase shifter may be 2 or 3, although other values of B may be used in some cases). In some cases, further incorporating amplitude measurements into matrix weightings in addition to phase only searching may result in additional beams for the dynamic codebook based on a number of RSRPs (e.g., for four RSRPs for a 4×1 array with B=3 and three phase factors, $512=(2^3)^3$ possible beams may be searched). The UE 115-a may determine weightings to be applied (e.g., $[h_1\ h_2\ h_3\ h_4]$) to antenna elements of the sub-array based on the search over the dynamic codebook. In some cases, adding the additional RSRP possibilities for a 4×1 array with B=2, beamforming gain over the coverage area of a 4×1 array (e.g., 210° azimuth×180° elevation), as plotted as a spherical coverage curve, may lead to a 1.5 dB median gain, and greater than 3 dB for $90^{th}$% tile gains, and may provide an improvement on the order of 0.5 dB at median, and 1.0 dB at $90^{th}$% tile, as compared to a phase shifter only search.

FIGS. 3A and 3B illustrate examples of amplitude perturbations 300 and 350 from signal blockage in wireless communications in accordance with aspects of the present disclosure. In the example of FIG. 3A, an illustration shows exemplary amplitude perturbations 300 over azimuth ($\phi$) and elevation ($\theta$) based on one finger blocking a 4×1 antenna sub-array (e.g., a sub-array 210 of FIG. 2) relative to unperturbed freespace antenna operation. In the example of FIG. 3B, an illustration shows exemplary amplitude perturbations 350 over azimuth ($\phi$) and elevation ($\theta$) based on two fingers blocking a 4×1 antenna sub-array (e.g., a sub-array 210 of FIG. 2) relative to unperturbed freespace antenna operation.

As may be observed from amplitude perturbations 300, the presence of one finger near the antenna elements in an antenna module leads relatively large areas of loss, with some areas that are unattenuated and relatively small areas in which there may be gains (e.g., due to phase perturbations in small gaps associated with the finger that result in signal gain). Further, as may be observed from amplitude perturbations 350, the presence of two fingers near the antenna elements in an antenna module leads to a larger areas of loss, and smaller unattenuated areas and areas with gain. In situations such as illustrated in FIGS. 3A and 3B, techniques as described herein may be implemented that may provide dynamic or adaptive beam weights in order to provide a beam directed toward the areas that are relatively unattenuated. Such techniques may result in enhanced reliability in wireless communications, reduced power consumption, reduced latency, and an enhanced user experience.

Figure 4:
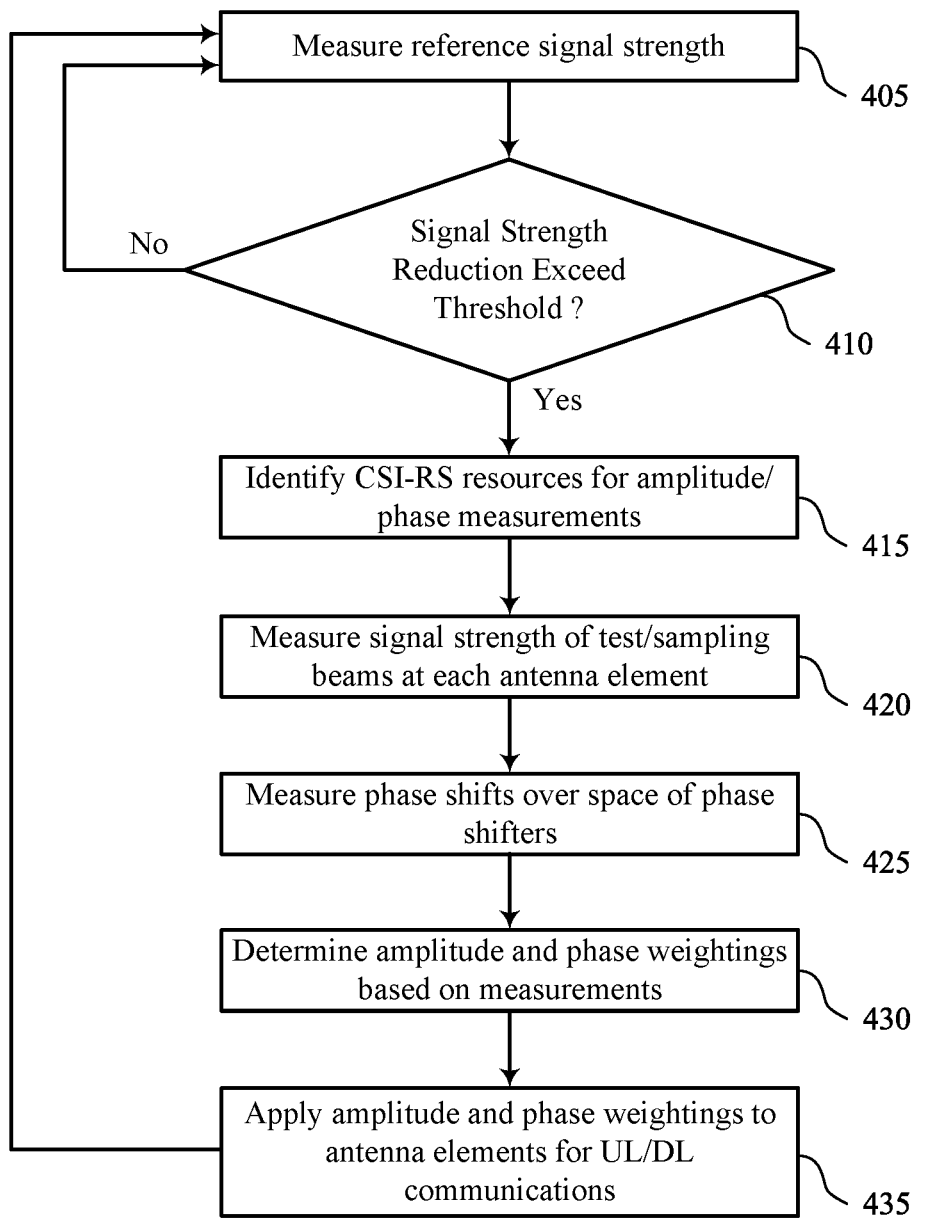
FIG. 4 illustrates an example of a flow chart for signal blockage mitigation techniques in wireless communications in accordance with aspects of the present disclosure.

FIG. 4 illustrates an example of a flow chart 400 that supports signal blockage mitigation techniques in wireless communications in accordance with aspects of the present disclosure. In some examples, the operations of flow chart 400 may be implemented by a UE, such as described with reference to FIGS. 1 and 2. While the example of FIG. 4 is discussed in relation to a UE, the operations and techniques may be implemented by other devices, such as a base station or other wireless node, and operations at other types of devices are within the scope of the present disclosure. In the following description of the flow chart 400, the described operations may be performed in a different order than the example order shown. Some operations may also be omitted from the flow chart 400, and other operations may be added to the flow chart 400.

In some examples, the operations illustrated in flow chart 400 may be performed by hardware (e.g., including circuitry, processing blocks, logic components, and other components), code (e.g., software or firmware) executed by a processor, or any combination thereof. Alternative examples of the following may be implemented, where some operations are performed in a different order than described or are not performed at all. In some cases, operations may include additional features not mentioned below, or further operations may be added.

At 405, the UE may measure reference signal strength of one or more reference signals. In some cases, the UE may measure a RSRP of a CSI-RS. In other cases, in addition to, or alternatively to, CSI-RS measurements, one or more other reference signals may be measured (e.g., demodulation reference signal (DMRS), sounding reference signal (SRS), phase tracking reference signal (PTRS), or combinations thereof). Further, in some cases one or more synchronization signals may be measured (e.g., a primary synchronization signal (PSS), secondary synchronization signal (SSS), or both). In some cases, the reference signal strength measurements may be made in accordance with periodic CSI measurements performed at the UE, using CSI-RS resources that are monitored and measured.

At 410, the UE may determine whether a signal strength reduction exceeds a threshold value. In some cases, the UE may compare a current signal strength measurement to one or more prior measurements, and the threshold value may be based on a percentage drop in the measured value (e.g., if a RSRP drops by a certain percentage). In some cases, additionally or alternatively, the signal strength reduction determination may be based on a rate at which the reduction is observed (e.g., if a rate of change of the RSRP is greater than a threshold value), which may indicate that a user has changed a grip on the UE and thus a hand blockage is present or has changed. In other cases, additionally or alternatively, the determination of the signal strength reduction may be based at least in part a number of HARQ negative acknowledgments (NACKs) associated with one or more transmissions have been transmitted (e.g., if a rate of NACK increases by greater than a threshold amount), which may indicate that a new blockage is being observed at the UE. Further, in some cases, the determination of the signal strength reduction may be based at least in part on a predictive model (e.g., based on artificial intelligence or machine learning) in which one or more inputs at the UE (e.g., application or type of data that is being transmitted, input from one or more sensors such as an orientation of the UE or a measured impedance, and the like). In the event that the UE determines that the signal strength reduction is not present, the operations at 405 may be repeated.

At 415, in the event that the UE determines that the signal strength reduction is present the UE may identify CSI-RS resources for amplitude and phase measurements as part of a dynamic or adaptive beam weight determination to determine beam weights beyond a static codebook set of beam weights. In some cases, the CSI-RS resources may include periodic CSI-RS resources, aperiodic CSI-RS resources, or any combinations thereof. In some cases, aperiodic CSI-RS resources may be triggered by the UE (e.g., based on a request from the UE or a CSI report provided by the UE). In other cases, one or more other reference signals may be measured in addition to the CSI-RS, or instead of the CSI-RS.

At 420, the UE may measure a signal strength of a test/sampling beam at each antenna element. In some cases, the signal strength may be measured as a RSRP, although other signal strength or amplitude measurements may be used. In some cases, the signal strength may be measured as a square root of RSRP observed with a single antenna element (e.g., a pseudo-omni beam).

At 425, the UE may measure phase shifts over a space of phase shifters. In some cases, the UE may measure RSRP using a B-bit phase shifter (e.g., B=2 or B=3 for a 4×1 antenna sub-array) for a number of phase factors associated with a number of antenna elements of the antenna array. In some cases, the phase shifts may be estimated with aperiodic CSI-RS resources to de-randomize the phase distortions induced by the hand blockage. In other cases, one or more other reference signals may be used, alone or in conjunction with the CSI-RS.

At 430, the UE may determine amplitude and phase weightings based on the signal strength and phase shifter measurements. In some cases, the UE may search over a set of beams and RSRPs such as discussed with reference to FIG. 2. At 435, the UE may apply the amplitude and phase weightings to antenna elements for communications with the base station, or other wireless device. The UE may then continue with operations as described starting at 405 (e.g., in the event that a user changes their grip on the UE, etc.).

Figure 5:
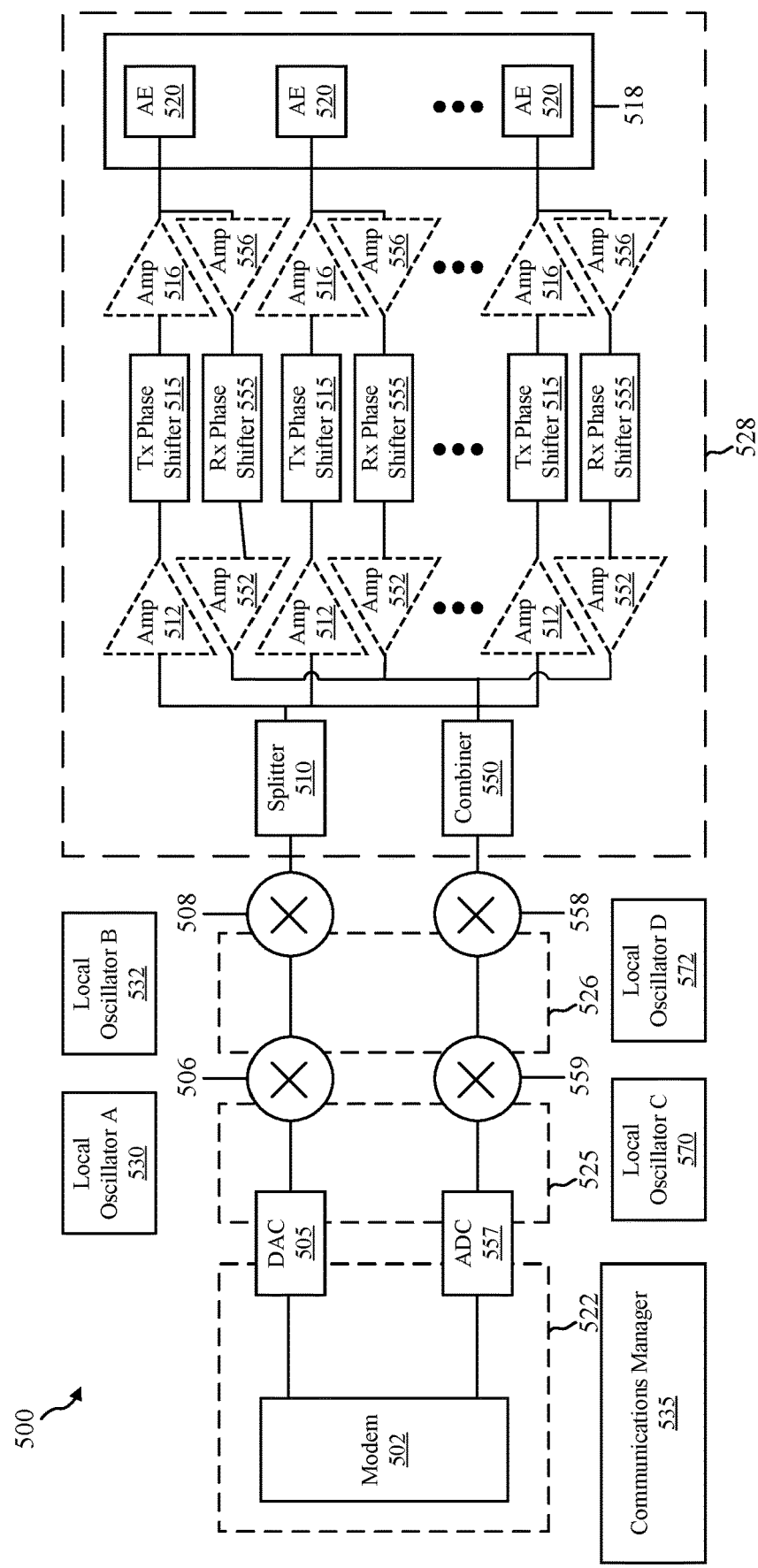
FIG. 5 illustrates an example of an architecture that supports signal blockage mitigation techniques in wireless communications in accordance with aspects of the present disclosure.

FIG. 5 illustrates an example of an architecture 500 that supports signal blockage mitigation techniques in wireless communications in accordance with aspects of the present disclosure. In some examples, architecture 500 may implement aspects of wireless communications system 100 or 200, as described with reference to FIGS. 1 and 2. In some examples, architecture 500 may be an example of components of a UE or other device that may perform signal blockage mitigation techniques, as described herein.

Broadly, FIG. 5 is a diagram illustrating example hardware components of a wireless device in accordance with certain aspects of the disclosure. The illustrated components may include those that may be used for antenna element selection and/or for beamforming for transmission of wireless signals. There are numerous architectures for antenna element selection and implementing phase shifting and amplitude weighting, only one example of which is illustrated here. The architecture 500 includes a modem (modulator/demodulator) 502, a digital to analog converter (DAC) 505, a first mixer 506, a second mixer 508, and a splitter 510. The architecture 500 also includes a plurality of first amplifiers 512, a plurality of phase shifters 515, a plurality of second amplifiers 516, and an antenna array 518 that includes a plurality of antenna elements 520. Transmission lines or other waveguides, wires, traces, or the like are shown connecting the various components to illustrate how signals to be transmitted may travel between components. Boxes 522, 525, 526, and 528 indicate regions in the architecture 500 in which different types of signals travel or are processed. Specifically, box 522 indicates a region in which digital baseband signals travel or are processed, box 525 indicates a region in which analog baseband signals travel or are processed, box 526 indicates a region in which analog intermediate frequency (IF) signals travel or are processed, and box 528 indicates a region in which analog radio frequency (RF) signals travel or are processed. The architecture also includes a local oscillator A 530, a local oscillator B 532, and a communications manager 535.

Each of the antenna elements 520 may include one or more sub-elements (not shown) for radiating or receiving RF signals. For example, a single antenna element 520 may include a first sub-element cross-polarized with a second sub-element that can be used to independently transmit cross-polarized signals. The antenna elements 520 may include patch antennas or other types of antennas arranged in a linear, two dimensional, or other pattern. A spacing between antenna elements 520 may be such that signals with a desired wavelength transmitted separately by the antenna elements 520 may interact or interfere (e.g., to form a desired beam). For example, given an expected range of wavelengths or frequencies, the spacing may provide a quarter wavelength, half wavelength, or other fraction of a wavelength of spacing between neighboring antenna elements 520 to allow for interaction or interference of signals transmitted by the separate antenna elements 520 within that expected range.

The modem 502 processes and generates digital baseband signals and may also control operation of the DAC 505, first and second mixers 506, 508, splitter 510, first amplifiers 512, phase shifters 515, and/or the second amplifiers 516 to transmit signals via one or more or all of the antenna elements 520. The modem 502 may process signals and control operation in accordance with a communication standard such as a wireless standard discussed herein. The DAC 505 may convert digital baseband signals received from the modem 502 (and that are to be transmitted) into analog baseband signals. The first mixer 506 upconverts analog baseband signals to analog IF signals within an IF using a local oscillator A 530. For example, the first mixer 506 may mix the signals with an oscillating signal generated by the local oscillator A 530 to "move" the baseband analog signals to the IF. In some cases some processing or filtering may take place at the IF. The second mixer 508 upconverts the analog IF signals to analog RF signals using the local oscillator B 532. Similarly to the first mixer, the second mixer 508 may mix the signals with an oscillating signal generated by the local oscillator B 532 to "move" the IF analog signals to the RF, or the frequency at which signals will be transmitted or received. The modem 502 and/or the communications manager 535 may adjust the frequency of local oscillator A 530 and/or the local oscillator B 532 so that a desired IF and/or RF frequency is produced and used to facilitate processing and transmission of a signal within a desired bandwidth.

In the illustrated architecture 500, signals upconverted by the second mixer 508 are split or duplicated into multiple signals by the splitter 510. The splitter 510 in architecture 500 splits the RF signal into a plurality of identical or nearly identical RF signals, as denoted by its presence in box 528. In other examples, the split may take place with any type of signal including with baseband digital, baseband analog, or IF analog signals. Each of these signals may correspond to an antenna element 520 and the signal travels through and is processed by amplifiers 512, 516, phase shifters 515, and/or other elements corresponding to the respective antenna element 520 to be provided to and transmitted by the corresponding antenna element 520 of the antenna array 518. In one example, the splitter 510 may be an active splitter that is connected to a power supply and provides some gain so that RF signals exiting the splitter 510 are at a power level equal to or greater than the signal entering the splitter 510. In another example, the splitter 510 is a passive splitter that is not connected to power supply and the RF signals exiting the splitter 510 may be at a power level lower than the RF signal entering the splitter 510.

After being split by the splitter 510, the resulting RF signals may enter an amplifier, such as a first amplifier 512, or a phase shifter 515 corresponding to an antenna element 520. The first and second amplifiers 512, 516 are illustrated with dashed lines because one or both of them might not be necessary in some implementations. In one implementation, both the first amplifier 512 and second amplifier 516 are present. In another, neither the first amplifier 512 nor the second amplifier 516 is present. In other implementations, one of the two amplifiers 512, 516 is present but not the other. By way of example, if the splitter 510 is an active splitter, the first amplifier 512 may not be used. By way of further example, if the phase shifter 515 is an active phase shifter that can provide a gain, the second amplifier 516 might not be used. The amplifiers 512, 516 may provide a desired level of positive or negative gain. A positive gain (positive dB) may be used to increase an amplitude of a signal for radiation by a specific antenna element 520. A negative gain (negative dB) may be used to decrease an amplitude and/or suppress radiation of the signal by a specific antenna element. Each of the amplifiers 512, 516 may be controlled independently (e.g., by the modem 502 or communications manager 535) to provide independent control of the gain for each antenna element 520. For example, the modem 502 and/or the communications manager 535 may have at least one control line connected to each of the splitter 510, first amplifiers 512, phase shifters 515, and/or second amplifiers 516 which may be used to configure a gain to provide a desired amount of gain for each component and thus each antenna element 520.

The phase shifter 515 may provide a configurable phase shift or phase offset to a corresponding RF signal to be transmitted. The phase shifter 515 could be a passive phase shifter not directly connected to a power supply. Passive phase shifters might introduce some insertion loss. The second amplifier 516 could boost the signal to compensate for the insertion loss. The phase shifter 515 could be an active phase shifter connected to a power supply such that the active phase shifter provides some amount of gain or prevents insertion loss. The settings of each of the phase shifters 515 are independent meaning that each can be set to provide a desired amount of phase shift or the same amount of phase shift or some other configuration. The modem 502 and/or the communications manager 535 may have at least one control line connected to each of the phase shifters 515 and which may be used to configure the phase shifters 515 to provide a desired amounts of phase shift or phase offset between antenna elements 520.

In the illustrated architecture 500, RF signals received by the antenna elements 520 are provided to one or more of first amplifier 556 to boost the signal strength. The first amplifier 556 may be connected to the same antenna arrays 518, e.g., for TDD operations. The first amplifier 556 may be connected to different antenna arrays 518. The boosted RF signal is input into one or more of phase shifter 555 to provide a configurable phase shift or phase offset for the corresponding received RF signal. The phase shifter 555 may be an active phase shifter or a passive phase shifter. The settings of the phase shifters 555 are independent, meaning that each can be set to provide a desired amount of phase shift or the same amount of phase shift or some other configuration. The modem 502 and/or the communications manager 535 may have at least one control line connected to each of the phase shifters 555 and which may be used to configure the phase shifters 555 to provide a desired amount of phase shift or phase offset between antenna elements 520.

The outputs of the phase shifters 555 may be input to one or more second amplifiers 552 for signal amplification of the phase shifted received RF signals. The second amplifiers 552 may be individually configured to provide a configured amount of gain. The second amplifiers 552 may be individually configured to provide an amount of gain to ensure that the signal input to combiner 550 have the same magnitude. The amplifiers 552 and/or 556 are illustrated in dashed lines because they might not be necessary in some implementations. In one implementation, both the amplifier 552 and the amplifier 556 are present. In another, neither the amplifier 552 nor the amplifier 556 are present. In other implementations, one of the amplifiers 552, 556 is present but not the other.

In the illustrated architecture 500, signals output by the phase shifters 555 (via the amplifiers 552 when present) are combined in combiner 550. The combiner 550 in architecture combines the RF signal into a signal, as denoted by its presence in box 528. The combiner 550 may be a passive combiner, e.g., not connected to a power source, which may result in some insertion loss. The combiner 550 may be an active combiner, e.g., connected to a power source, which may result in some signal gain. When combiner 550 is an active combiner, it may provide a different (e.g., configurable) amount of gain for each input signal so that the input signals have the same magnitude when they are combined. When combiner 550 is an active combiner, it may not need the second amplifier 552 because the active combiner may provide the signal amplification.

The output of the combiner 550 is input into mixers 558 and 559. Mixers 558 and 559 generally down convert the received RF signal using inputs from local oscillators 572 and 570, respectively, to create intermediate or baseband signals that carry the encoded and modulated information. The output of the mixers 558 and 559 are input into an analog-to-digital converter (ADC) 557 for conversion to analog signals. The analog signals output from ADC 557 is input to modem 502 for baseband processing, e.g., decoding, de-interleaving, etc.

The architecture 500 is given by way of example only to illustrate an architecture for transmitting and/or receiving signals, in which amplitude and phase weightings may be applied to received or transmitted signals in accordance with techniques as discussed herein. It will be understood that the architecture 500 and/or each portion of the architecture 500 may be repeated multiple times within an architecture to accommodate or provide an arbitrary number of RF chains, antenna elements, and/or antenna panels. Furthermore, numerous alternate architectures are possible and contemplated. For example, although only a single antenna array 518 is shown, two, three, or more antenna arrays may be included each with one or more of their own corresponding amplifiers, phase shifters, splitters, mixers, DACs, ADCs, and/or modems. For example, a single UE may include two, four or more antenna arrays for transmitting or receiving signals at different physical locations on the UE or in different directions. Furthermore, mixers, splitters, amplifiers, phase shifters and other components may be located in different signal type areas (e.g., different ones of the boxes 522, 525, 526, 528) in different implemented architectures. In one example, the functions of one or more of the components may be combined into one component. For example, the phase shifters 555 may perform amplification to include or replace the first and/or or second amplifiers 556, 552.

The modem 502 and/or the communications manager 535 may control one or more of the other components 505-572 to select one or more antenna elements 520 and/or to form beams for transmission of one or more signals. For example, the antenna elements 520 may be individually selected or deselected for transmission or reception of a signal (or signals) by controlling an amplitude of one or more corresponding amplifiers, such as the first amplifiers 512, 556 and/or the second amplifiers 516, 552. Beamforming includes generation of a beam using a plurality of signals on different antenna elements where one or more or all of the plurality signals are shifted in phase relative to each other. The formed beam may carry physical or higher layer reference signals or information. As each signal of the plurality of signals is radiated from a respective antenna element 520, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 518) can be dynamically controlled by modifying the phase shifts or phase offsets imparted by the phase shifters and amplitudes imparted by the amplifiers of the plurality of signals relative to each other.

The communications manager 535, when architecture 500 is configured as a receiving device, may provide for measuring, for one or more antenna elements 520 of a set of multiple antenna elements 520, an amplitude of one or more reference signals received from an access network entity. The communications manager 535 may also provide for measuring a received power of the one or more reference signals for one or more phase shifter values of a set of multiple phase shifter values applied to the set of multiple antenna elements 520. The communications manager 535 may apply a set of amplitude weightings and a set of phase weightings to the set of multiple antenna elements 520, where the set of amplitude weightings are based on the measured amplitudes and the set of phase weightings are based on the measured received powers. The communications manager 535 may control receiving one or more downlink transmissions from the access network entity based on the set of amplitude weightings and the set of phase weightings applied to the set of multiple antenna elements.

Figure 6:
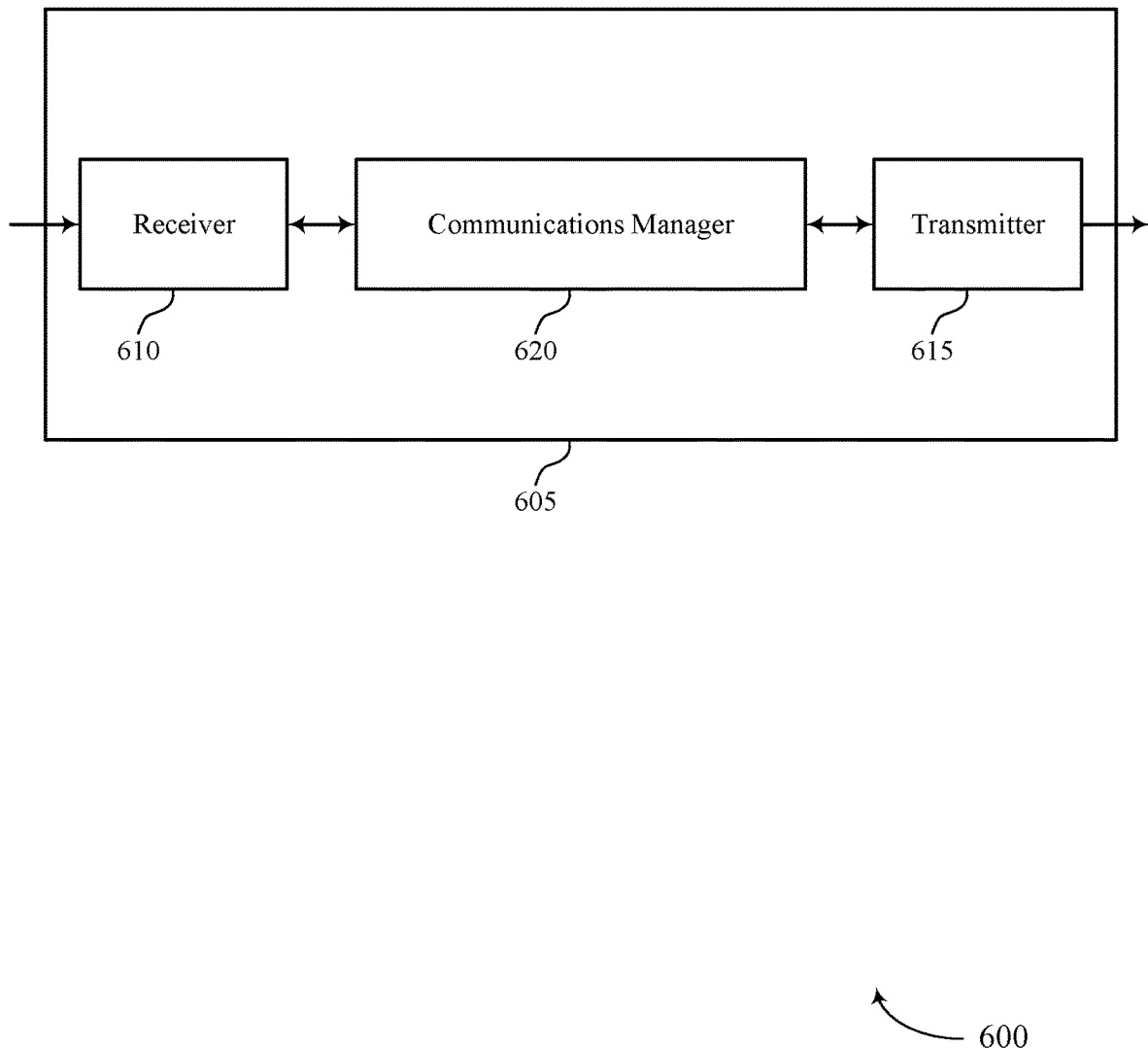
FIGS. 6 and 7 show block diagrams of devices that support signal blockage mitigation techniques in wireless communications in accordance with aspects of the present disclosure.

FIG. 6 shows a block diagram 600 of a device 605 that supports signal blockage mitigation techniques in wireless communications in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to signal blockage mitigation techniques in wireless communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to signal blockage mitigation techniques in wireless communications). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of signal blockage mitigation techniques in wireless communications as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. For example, the communications manager 620 may be configured as or otherwise support a means for measuring, for one or more antenna elements of a set of multiple antenna elements at the UE, an amplitude of one or more reference signals received from an access network entity. The communications manager 620 may be configured as or otherwise support a means for measuring a received power of the one or more reference signals for one or more phase shifter values of a set of multiple phase shifter values applied to the set of multiple antenna elements. The communications manager 620 may be configured as or otherwise support a means for applying a set of amplitude weightings and a set of phase weightings to the set of multiple antenna elements, where the set of amplitude weightings are based on the measured amplitudes and the set of phase weightings are based on the measured received powers. The communications manager 620 may be configured as or otherwise support a means for receiving one or more downlink transmissions from the access network entity based on the set of amplitude weightings and the set of phase weightings applied to the set of multiple antenna elements.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for blockage detection and mitigation based on amplitude weightings and phase weightings, which may enhance communications reliability, provide reduced latency, reduced power consumption, more efficient utilization of communication resources, or any combinations thereof.

Figure 7:
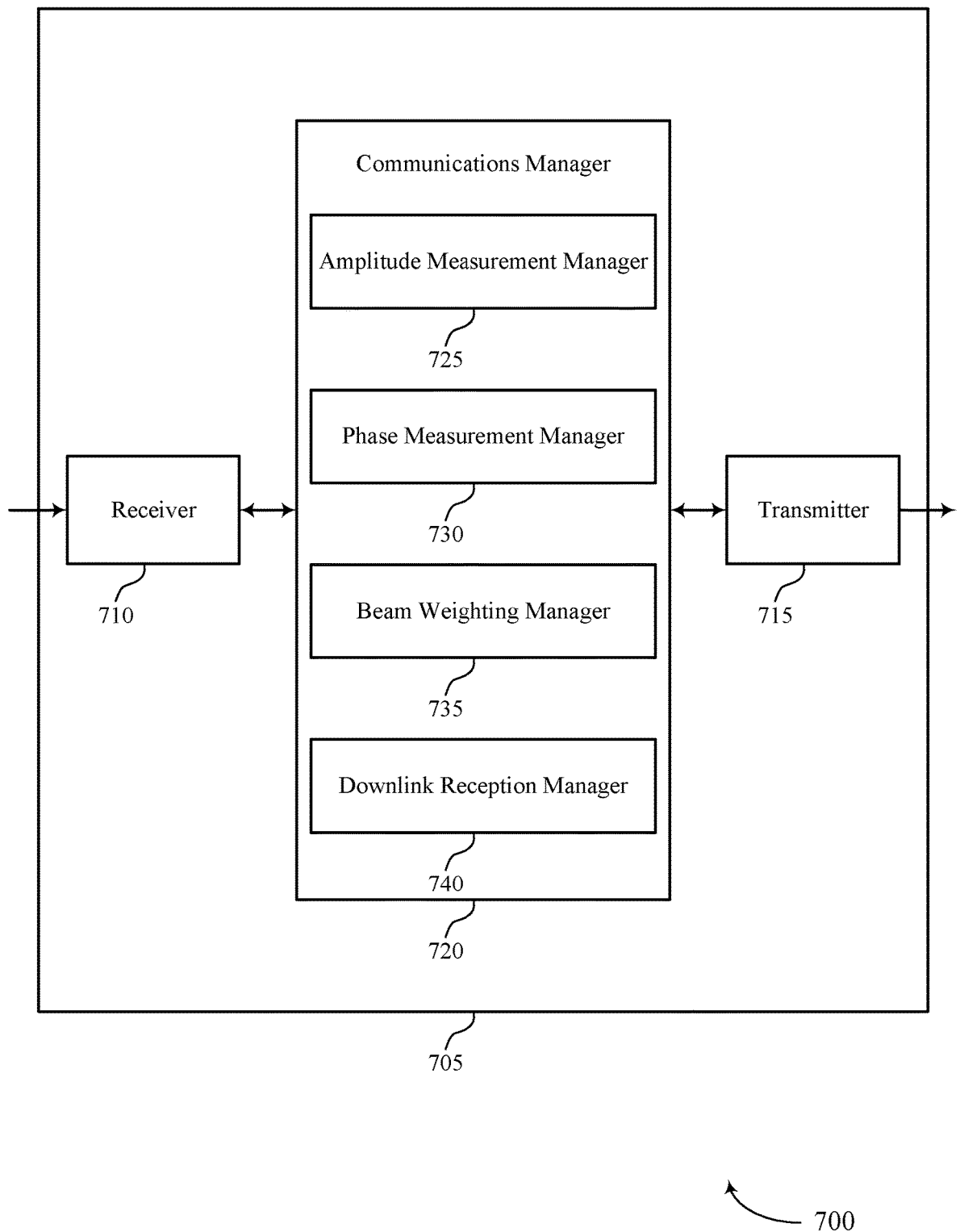

FIG. 7 shows a block diagram 700 of a device 705 that supports signal blockage mitigation techniques in wireless communications in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to signal blockage mitigation techniques in wireless communications). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to signal blockage mitigation techniques in wireless communications). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of signal blockage mitigation techniques in wireless communications as described herein. For example, the communications manager 720 may include an amplitude measurement manager 725, a phase measurement manager 730, a beam weighting manager 735, a downlink reception manager 740, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. The amplitude measurement manager 725 may be configured as or otherwise support a means for measuring, for one or more antenna elements of a set of multiple antenna elements at the UE, an amplitude of one or more reference signals received from an access network entity. The phase measurement manager 730 may be configured as or otherwise support a means for measuring a received power of the one or more reference signals for one or more phase shifter values of a set of multiple phase shifter values applied to the set of multiple antenna elements. The beam weighting manager 735 may be configured as or otherwise support a means for applying a set of amplitude weightings and a set of phase weightings to the set of multiple antenna elements, where the set of amplitude weightings are based on the measured amplitudes and the set of phase weightings are based on the measured received powers. The downlink reception manager 740 may be configured as or otherwise support a means for receiving one or more downlink transmissions from the access network entity based on the set of amplitude weightings and the set of phase weightings applied to the set of multiple antenna elements.

Figure 8:
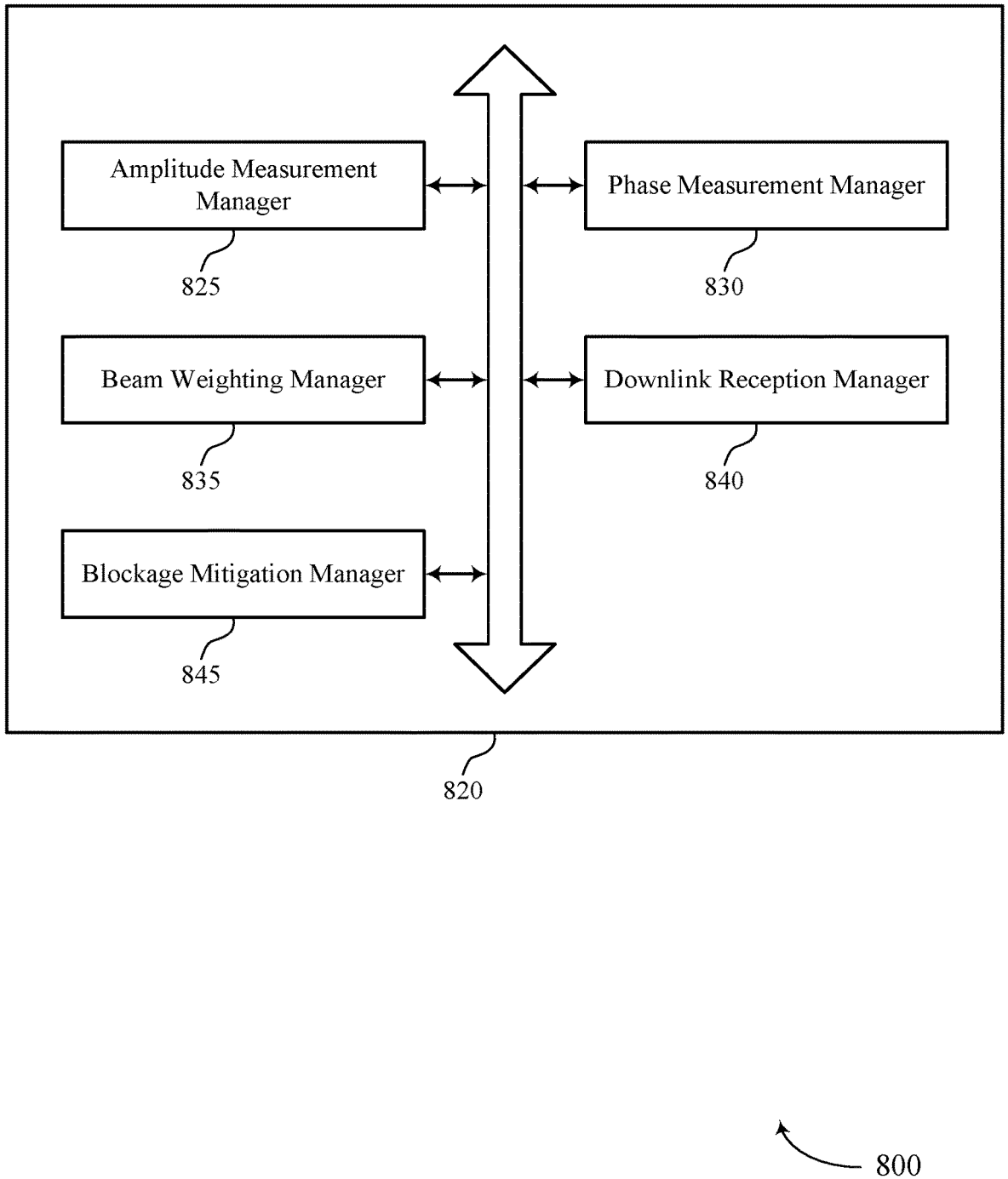
FIG. 8 shows a block diagram of a communications manager that supports signal blockage mitigation techniques in wireless communications in accordance with aspects of the present disclosure.

FIG. 8 shows a block diagram 800 of a communications manager 820 that supports signal blockage mitigation techniques in wireless communications in accordance with aspects of the present disclosure. The communications manager 820 may be an example of aspects of a communications manager 620, a communications manager 720, or both, as described herein. The communications manager 820, or various components thereof, may be an example of means for performing various aspects of signal blockage mitigation techniques in wireless communications as described herein. For example, the communications manager 820 may include an amplitude measurement manager 825, a phase measurement manager 830, a beam weighting manager 835, a downlink reception manager 840, a blockage mitigation manager 845, or any combination thereof. Each of these components may communicate, directly or indirectly, with one another (e.g., via one or more buses).

The communications manager 820 may support wireless communication at a UE in accordance with examples as disclosed herein. The amplitude measurement manager 825 may be configured as or otherwise support a means for measuring, for one or more antenna elements of a set of multiple antenna elements at the UE, an amplitude of one or more reference signals received from an access network entity. The phase measurement manager 830 may be configured as or otherwise support a means for measuring a received power of the one or more reference signals for one or more phase shifter values of a set of multiple phase shifter values applied to the set of multiple antenna elements. The beam weighting manager 835 may be configured as or otherwise support a means for applying a set of amplitude weightings and a set of phase weightings to the set of multiple antenna elements, where the set of amplitude weightings are based on the measured amplitudes and the set of phase weightings are based on the measured received powers. The downlink reception manager 840 may be configured as or otherwise support a means for receiving one or more downlink transmissions from the access network entity based on the set of amplitude weightings and the set of phase weightings applied to the set of multiple antenna elements.

In some examples, the blockage mitigation manager 845 may be configured as or otherwise support a means for initiating a procedure to obtain the set of amplitude weightings and the set of phase weightings based on a detection of a signal strength reduction at the UE that exceeds a threshold value. In some examples, the detection of the signal strength reduction that exceeds the threshold value is based on periodic reference signal measurements of the UE, and where the threshold value corresponds to a strength reduction that indicates a hand blockage of one or more antenna elements of the set of multiple antenna elements.

In some examples, the set of phase weightings are determined based on one or more aperiodic reference signals transmitted by the access network entity. In some examples, the one or more aperiodic reference signals de-randomize phase distortions induced by a blockage of one or more antenna elements of the set of multiple antenna elements.

In some examples, the amplitude of the one or more reference signals is measured for one antenna element at a time in an antenna array that includes the set of multiple antenna elements. In some examples, the measured amplitudes and the measured received powers correspond to reference signal received powers (RSRPs) of the one or more reference signals.

In some examples, to support applying the set of amplitude weightings and the set of phase weightings, the beam weighting manager 835 may be configured as or otherwise support a means for applying a matrix of products of amplitude weightings and phase weightings to signals of each antenna, where the matrix is weighted based on a summation of the measured amplitudes. In some examples, the amplitude weighting associated with each antenna element is applied to a corresponding phase weighting as an amplitude that is a square root of a reference signal received power of the one or more reference signals that is measured at the corresponding antenna element. In some examples, the matrix is weighted by an inverse of a square root of a summation of each of the measured RSRPs to provide unit energy beamforming. In some examples, the set of multiple phase shifter values are determined based on a B-bit phase shifter search and a number of phase factors that are based on a number of antenna elements of the set of multiple antenna elements. In some examples, the number of phase factors is set to one less than the number of antenna elements.

Figure 9:
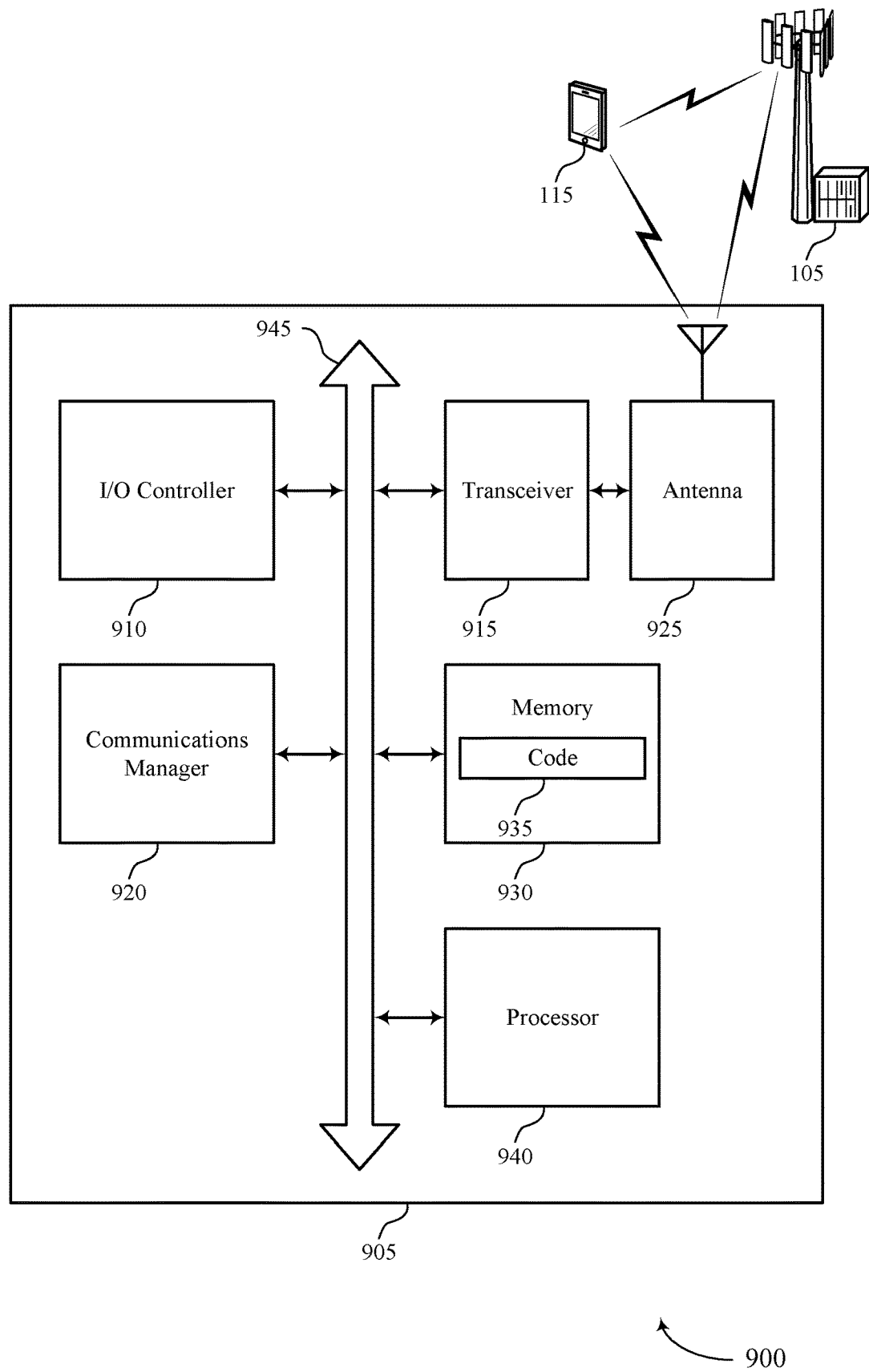
FIG. 9 shows a diagram of a system including a device that supports signal blockage mitigation techniques in wireless communications in accordance with aspects of the present disclosure.

FIG. 9 shows a diagram of a system 900 including a device 905 that supports signal blockage mitigation techniques in wireless communications in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting signal blockage mitigation techniques in wireless communications). For example, the device 905 or a component of the device 905 may include a processor 940 and memory 930 coupled to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for measuring, for one or more antenna elements of a set of multiple antenna elements at the UE, an amplitude of one or more reference signals received from an access network entity. The communications manager 920 may be configured as or otherwise support a means for measuring a received power of the one or more reference signals for one or more phase shifter values of a set of multiple phase shifter values applied to the set of multiple antenna elements. The communications manager 920 may be configured as or otherwise support a means for applying a set of amplitude weightings and a set of phase weightings to the set of multiple antenna elements, where the set of amplitude weightings are based on the measured amplitudes and the set of phase weightings are based on the measured received powers. The communications manager 920 may be configured as or otherwise support a means for receiving one or more downlink transmissions from the access network entity based on the set of amplitude weightings and the set of phase weightings applied to the set of multiple antenna elements.

By including or configuring the communications manager 920 in accordance with examples as described herein, the device 905 may support techniques for blockage detection and mitigation based on amplitude weightings and phase weightings, which may enhance communications reliability, provide reduced latency, reduced power consumption, more efficient utilization of communication resources, or any combinations thereof.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of signal blockage mitigation techniques in wireless communications as described herein, or the processor 940 and the memory 930 may be otherwise configured to perform or support such operations.

Figure 10:
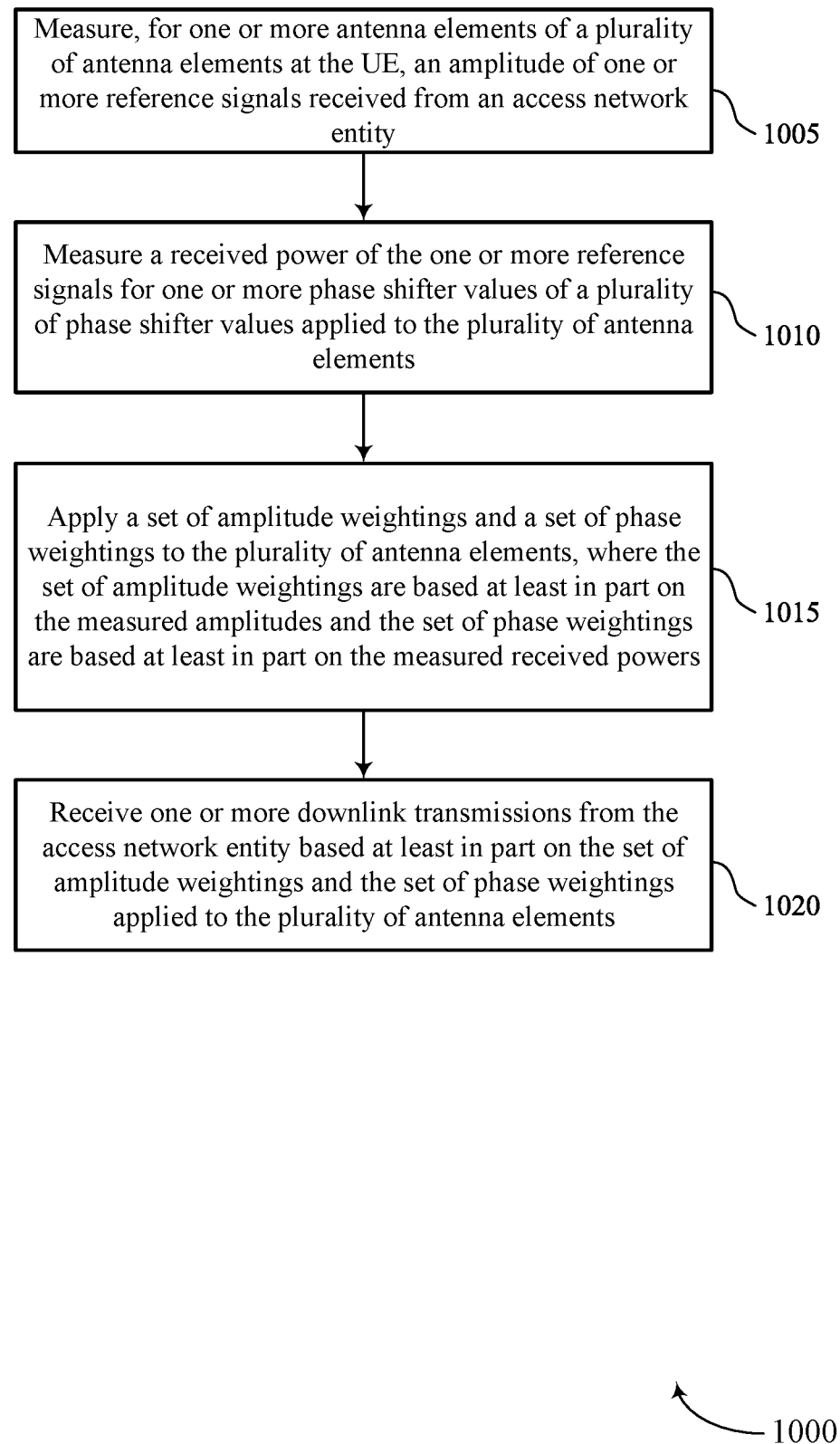
FIGS. 10 through 12 show flowcharts illustrating methods that support signal blockage mitigation techniques in wireless communications in accordance with aspects of the present disclosure.

FIG. 10 shows a flowchart illustrating a method 1000 that supports signal blockage mitigation techniques in wireless communications in accordance with aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1005, the method may include measuring, for one or more antenna elements of a set of multiple antenna elements at the UE, an amplitude of one or more reference signals received from an access network entity. The operations of 1005 may be performed in accordance with examples as disclosed herein. In some examples, aspects of the operations of 1005 may be performed by an amplitude measurement manager 825 as described with reference to FIG. 8.

At 1010, the method may include measuring a received power of the one or more reference signals for one or more phase shifter values of a set of multiple phase shifter values applied to the set of multiple antenna elements. The operations of 1010 may be performed in accordance with examples as disclosed herein. In some examples, aspects of the operations of 1010 may be performed by a phase measurement manager 830 as described with reference to FIG. 8. In some cases, the measured amplitudes and the measured received powers correspond to RSRPs of the one or more reference signals. In some cases, the set of multiple phase shifter values are determined based on a B-bit phase shifter search and a number of phase factors that are based on a number of antenna elements of the set of multiple antenna elements. In some cases, the number of phase factors is set to one less than the number of antenna elements.

At 1015, the method may include applying a set of amplitude weightings and a set of phase weightings to the set of multiple antenna elements, where the set of amplitude weightings are based on the measured amplitudes and the set of phase weightings are based on the measured received powers. The operations of 1015 may be performed in accordance with examples as disclosed herein. In some examples, aspects of the operations of 1015 may be performed by a beam weighting manager 835 as described with reference to FIG. 8. In some cases, the set of phase weightings are determined based on one or more aperiodic reference signals transmitted by the access network entity. In some cases, measurements are made based on one or more aperiodic reference signals, where the one or more aperiodic reference signals de-randomize phase distortions induced by a blockage of one or more antenna elements of the set of multiple antenna elements. In some cases, the amplitude of the one or more reference signals is measured for one antenna element at a time in an antenna array that includes a set of multiple antenna elements.

At 1020, the method may include receiving one or more downlink transmissions from the access network entity based on the set of amplitude weightings and the set of phase weightings applied to the set of multiple antenna elements. The operations of 1020 may be performed in accordance with examples as disclosed herein. In some examples, aspects of the operations of 1020 may be performed by a downlink reception manager 840 as described with reference to FIG. 8.

Figure 11:
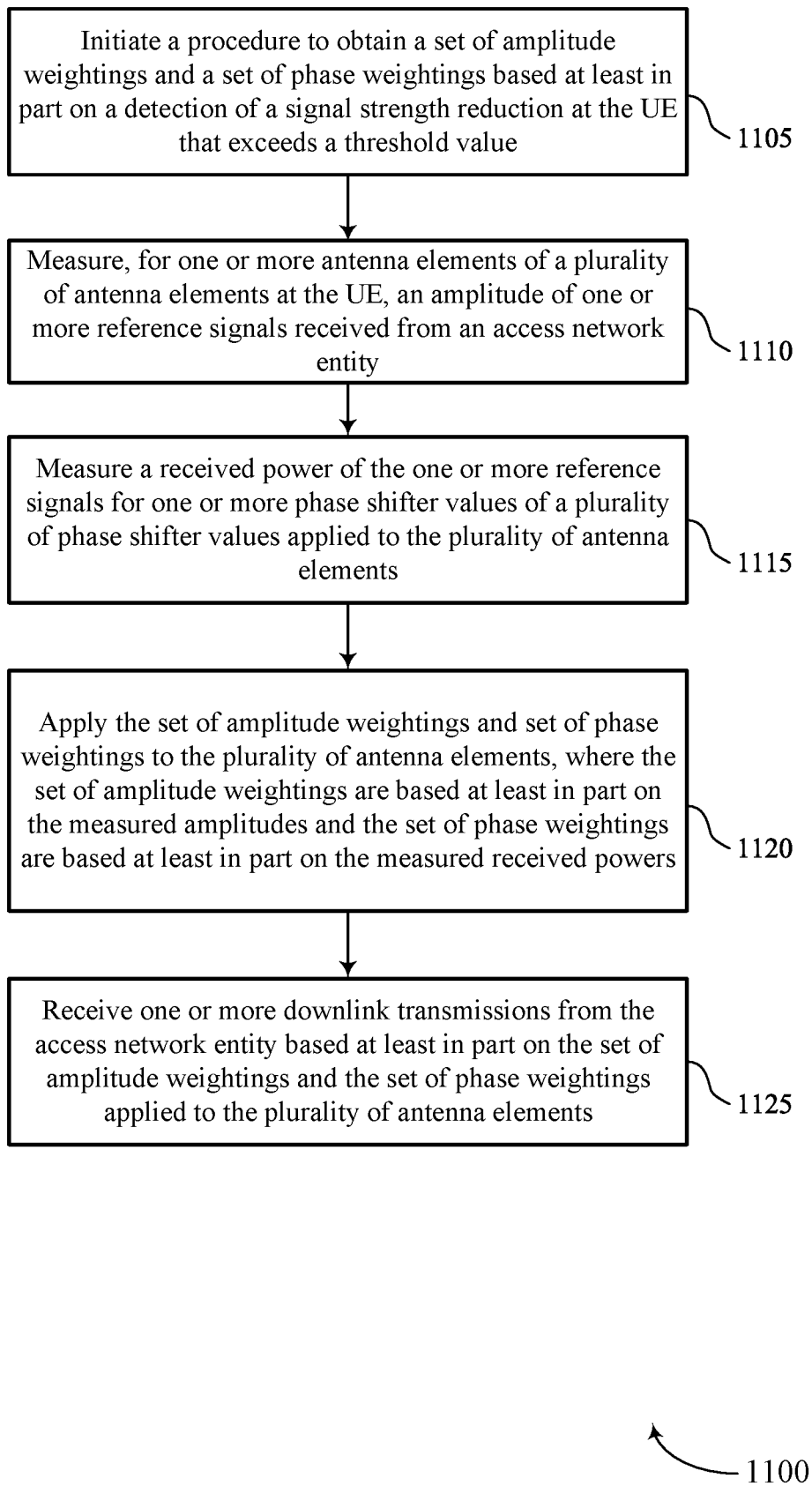

FIG. 11 shows a flowchart illustrating a method 1100 that supports signal blockage mitigation techniques in wireless communications in accordance with aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1105, the method may include initiating a procedure to obtain a set of amplitude weightings and a set of phase weightings based on a detection of a signal strength reduction at the UE that exceeds a threshold value. The operations of 1105 may be performed in accordance with examples as disclosed herein. In some examples, aspects of the operations of 1105 may be performed by a blockage mitigation manager 845 as described with reference to FIG. 8. In some cases, the detection of the signal strength reduction that exceeds the threshold value is based on periodic reference signal measurements of the UE, and where the threshold value corresponds to a strength reduction that indicates a hand blockage of one or more antenna elements of the set of multiple antenna elements.

At 1110, the method may include measuring, for one or more antenna elements of a set of multiple antenna elements at the UE, an amplitude of one or more reference signals received from an access network entity. The operations of 1110 may be performed in accordance with examples as disclosed herein. In some examples, aspects of the operations of 1110 may be performed by an amplitude measurement manager 825 as described with reference to FIG. 8.

At 1115, the method may include measuring a received power of the one or more reference signals for one or more phase shifter values of a set of multiple phase shifter values applied to the set of multiple antenna elements. The operations of 1115 may be performed in accordance with examples as disclosed herein. In some examples, aspects of the operations of 1115 may be performed by a phase measurement manager 830 as described with reference to FIG. 8.

At 1120, the method may include applying the set of amplitude weightings and the set of phase weightings to the set of multiple antenna elements, where the set of amplitude weightings are based on the measured amplitudes and the set of phase weightings are based on the measured received powers. The operations of 1120 may be performed in accordance with examples as disclosed herein. In some examples, aspects of the operations of 1120 may be performed by a beam weighting manager 835 as described with reference to FIG. 8.

At 1125, the method may include receiving one or more downlink transmissions from the access network entity based on the set of amplitude weightings and the set of phase weightings applied to the set of multiple antenna elements. The operations of 1125 may be performed in accordance with examples as disclosed herein. In some examples, aspects of the operations of 1125 may be performed by a downlink reception manager 840 as described with reference to FIG. 8.

Figure 12:
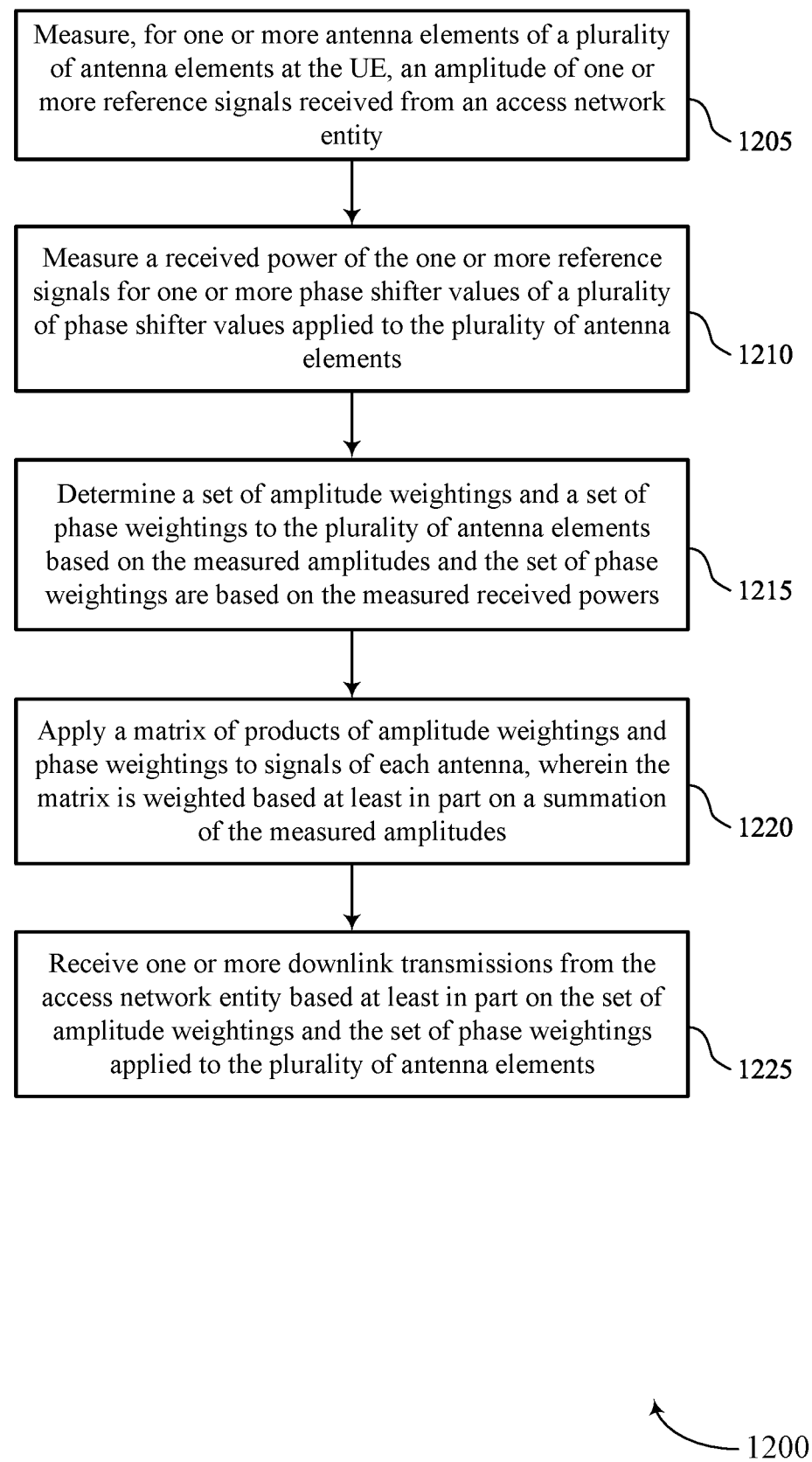

FIG. 12 shows a flowchart illustrating a method 1200 that supports signal blockage mitigation techniques in wireless communications in accordance with aspects of the present disclosure. The operations of the method 1200 may be implemented by a UE or its components as described herein. For example, the operations of the method 1200 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1205, the method may include measuring, for one or more antenna elements of a set of multiple antenna elements at the UE, an amplitude of one or more reference signals received from an access network entity. The operations of 1205 may be performed in accordance with examples as disclosed herein. In some examples, aspects of the operations of 1205 may be performed by an amplitude measurement manager 825 as described with reference to FIG. 8.

At 1210, the method may include measuring a received power of the one or more reference signals for one or more phase shifter values of a set of multiple phase shifter values applied to the set of multiple antenna elements. The operations of 1210 may be performed in accordance with examples as disclosed herein. In some examples, aspects of the operations of 1210 may be performed by a phase measurement manager 830 as described with reference to FIG. 8.

At 1215, the method may include determining a set of amplitude weightings and a set of phase weightings to the set of multiple antenna elements based on the measured amplitudes and the set of phase weightings are based on the measured received powers. The operations of 1215 may be performed in accordance with examples as disclosed herein. In some examples, aspects of the operations of 1215 may be performed by a beam weighting manager 835 as described with reference to FIG. 8.

At 1220, the method may include applying a matrix of products of amplitude weightings and phase weightings to signals of each antenna, where the matrix is weighted based on a summation of the measured amplitudes. The operations of 1220 may be performed in accordance with examples as disclosed herein. In some examples, aspects of the operations of 1220 may be performed by a beam weighting manager 835 as described with reference to FIG. 8. In some cases, the amplitude weighting associated with each antenna element is applied to a corresponding phase weighting as an amplitude that is a square root of a reference signal received power of the one or more reference signals that is measured at the corresponding antenna element. In some cases, the matrix is weighted by an inverse of a square root of a summation of each of the measured RSRPs to provide unit energy beamforming.

At 1225, the method may include receiving one or more downlink transmissions from the access network entity based on the set of amplitude weightings and the set of phase weightings applied to the set of multiple antenna elements. The operations of 1225 may be performed in accordance with examples as disclosed herein. In some examples, aspects of the operations of 1225 may be performed by a downlink reception manager 840 as described with reference to FIG. 8.

The following provides an overview of aspects of the present disclosure:

Aspect 1: A method for wireless communication at a UE, comprising: measuring, for one or more antenna elements of a plurality of antenna elements at the UE, an amplitude of one or more reference signals received from an access network entity; measuring a received power of the one or more reference signals for one or more phase shifter values of a plurality of phase shifter values applied to the plurality of antenna elements; applying a set of amplitude weightings and a set of phase weightings to the plurality of antenna elements, wherein the set of amplitude weightings are based at least in part on the measured amplitudes and the set of phase weightings are based at least in part on the measured received powers; and receiving one or more downlink transmissions from the access network entity based at least in part on the set of amplitude weightings and the set of phase weightings applied to the plurality of antenna elements.

Aspect 2: The method of aspect 1, further comprising: initiating a procedure to obtain the set of amplitude weightings and the set of phase weightings based at least in part on a detection of a signal strength reduction at the UE that exceeds a threshold value.

Aspect 3: The method of aspect 2, wherein the detection of the signal strength reduction that exceeds the threshold value is based at least in part on periodic reference signal measurements of the UE, and wherein the threshold value corresponds to a strength reduction that indicates a hand blockage of one or more antenna elements of the plurality of antenna elements.

Aspect 4: The method of any of aspects 1 through 3, wherein the set of phase weightings are determined based at least in part on one or more aperiodic reference signals transmitted by the access network entity.

Aspect 5: The method of aspect 4, wherein the one or more aperiodic reference signals de-randomize phase distortions induced by a blockage of one or more antenna elements of the plurality of antenna elements.

Aspect 6: The method of any of aspects 1 through 5, wherein the amplitude of the one or more reference signals is measured for one antenna element at a time in an antenna array that includes the plurality of antenna elements.

Aspect 7: The method of any of aspects 1 through 6, wherein the measured amplitudes and the measured received powers correspond to reference signal received powers (RSRPs) of the one or more reference signals.

Aspect 8: The method of any of aspects 1 through 7, wherein the applying the set of amplitude weightings and the set of phase weightings comprises: applying a matrix of products of amplitude weightings and phase weightings to signals of each antenna, wherein the matrix is weighted based at least in part on a summation of the measured amplitudes.

Aspect 9: The method of aspect 8, wherein the amplitude weighting associated with each antenna element is applied to a corresponding phase weighting as an amplitude that is a square root of a reference signal received power of the one or more reference signals that is measured at the corresponding antenna element.

Aspect 10: The method of aspect 9, wherein the matrix is weighted by an inverse of a square root of a summation of each of the measured RSRPs to provide unit energy beamforming.

Aspect 11: The method of any of aspects 1 through 10, wherein the plurality of phase shifter values are determined based at least in part on a B-bit phase shifter search and a number of phase factors that are based at least in part on a number of antenna elements of the plurality of antenna elements.

Aspect 12: The method of aspect 11, wherein the number of phase factors is set to one less than the number of antenna elements.

Aspect 13: An apparatus for wireless communication at a UE, comprising a processor; memory coupled with the processor; and instructions stored in the memory and executable by the processor to cause the apparatus to perform a method of any of aspects 1 through 12.

Aspect 14: An apparatus for wireless communication at a UE, comprising at least one means for performing a method of any of aspects 1 through 12.

Aspect 15: A non-transitory computer-readable medium storing code for wireless communication at a UE, the code comprising instructions executable by a processor to perform a method of any of aspects 1 through 12.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    measuring, for one or more antenna elements of a plurality of antenna elements at the UE, an amplitude of one or more reference signals received from an access network entity;
    measuring a received power of the one or more reference signals for one or more phase shifter values of a plurality of phase shifter values applied to the plurality of antenna elements;
    applying a set of amplitude weightings and a set of phase weightings to the plurality of antenna elements, wherein the set of amplitude weightings are based at least in part on the measured amplitudes and the set of phase weightings are based at least in part on the measured received powers; and
    receiving one or more downlink transmissions from the access network entity based at least in part on the set of amplitude weightings and the set of phase weightings applied to the plurality of antenna elements.

2. The method of claim 1, further comprising:
    initiating a procedure to obtain the set of amplitude weightings and the set of phase weightings based at least in part on a detection of a signal strength reduction at the UE that exceeds a threshold value.

3. The method of claim 2, wherein the detection of the signal strength reduction that exceeds the threshold value is based at least in part on periodic reference signal measurements of the UE, and wherein the threshold value corresponds to a strength reduction that indicates a hand blockage of one or more antenna elements of the plurality of antenna elements.

4. The method of claim 1, wherein the set of phase weightings are determined based at least in part on one or more aperiodic reference signals transmitted by the access network entity.

5. The method of claim 4, wherein the one or more aperiodic reference signals de-randomize phase distortions induced by a blockage of one or more antenna elements of the plurality of antenna elements.

6. The method of claim 1, wherein the amplitude of the one or more reference signals is measured for one antenna element at a time in an antenna array that includes the plurality of antenna elements.

7. The method of claim 1, wherein the measured amplitudes and the measured received powers correspond to reference signal received powers (RSRPs) of the one or more reference signals.

8. The method of claim 1, wherein the applying the set of amplitude weightings and the set of phase weightings comprises:
applying a matrix of products of amplitude weightings and phase weightings to signals of each antenna, wherein the matrix is weighted based at least in part on a summation of the measured amplitudes.

9. The method of claim 8, wherein the amplitude weighting associated with each antenna element is applied to a corresponding phase weighting as an amplitude that is a square root of a reference signal received power of the one or more reference signals that is measured at the corresponding antenna element.

10. The method of claim 9, wherein the matrix is weighted by an inverse of a square root of a summation of each of the measured RSRPs to provide unit energy beamforming.

11. The method of claim 1, wherein the plurality of phase shifter values are determined based at least in part on a B-bit phase shifter search and a number of phase factors that are based at least in part on a number of antenna elements of the plurality of antenna elements.

12. The method of claim 11, wherein the number of phase factors is set to one less than the number of antenna elements.

13. An apparatus for wireless communication at a user equipment (UE), comprising:
a processor;
memory coupled with the processor; and
instructions stored in the memory and executable by the processor to cause the apparatus to:
measure, for one or more antenna elements of a plurality of antenna elements at the UE, an amplitude of one or more reference signals received from an access network entity;
measure a received power of the one or more reference signals for one or more phase shifter values of a plurality of phase shifter values applied to the plurality of antenna elements;
apply a set of amplitude weightings and a set of phase weightings to the plurality of antenna elements, wherein the set of amplitude weightings are based at least in part on the measured amplitudes and the set of phase weightings are based at least in part on the measured received powers; and
receive one or more downlink transmissions from the access network entity based at least in part on the set of amplitude weightings and the set of phase weightings applied to the plurality of antenna elements.

14. The apparatus of claim 13, wherein the instructions are further executable by the processor to cause the apparatus to:
initiate a procedure to obtain the set of amplitude weightings and the set of phase weightings based at least in part on a detection of a signal strength reduction at the UE that exceeds a threshold value.

15. The apparatus of claim 14, wherein the detection of the signal strength reduction that exceeds the threshold value is based at least in part on periodic reference signal measurements of the UE, and wherein the threshold value corresponds to a strength reduction that indicates a hand blockage of one or more antenna elements of the plurality of antenna elements.

16. The apparatus of claim 13, wherein the set of phase weightings are determined based at least in part on one or more aperiodic reference signals transmitted by the access network entity.

17. The apparatus of claim 16, wherein the one or more aperiodic reference signals de-randomize phase distortions induced by a blockage of one or more antenna elements of the plurality of antenna elements.

18. The apparatus of claim 13, wherein the amplitude of the one or more reference signals is measured for one antenna element at a time in an antenna array that includes the plurality of antenna elements.

19. The apparatus of claim 13, wherein the measured amplitudes and the measured received powers correspond to reference signal received powers (RSRPs) of the one or more reference signals.

20. The apparatus of claim 13, wherein the instructions to apply the set of amplitude weightings and the set of phase weightings are executable by the processor to cause the apparatus to:
apply a matrix of products of amplitude weightings and phase weightings to signals of each antenna, wherein the matrix is weighted based at least in part on a summation of the measured amplitudes.

21. The apparatus of claim 20, wherein the amplitude weighting associated with each antenna element is applied to a corresponding phase weighting as an amplitude that is a square root of a reference signal received power of the one or more reference signals that is measured at the corresponding antenna element.

22. The apparatus of claim 21, wherein the matrix is weighted by an inverse of a square root of a summation of each of the measured RSRPs to provide unit energy beamforming.

23. The apparatus of claim 13, wherein the plurality of phase shifter values are determined based at least in part on a B-bit phase shifter search and a number of phase factors that are based at least in part on a number of antenna elements of the plurality of antenna elements.

24. The apparatus of claim 23, wherein the number of phase factors is set to one less than the number of antenna elements.

25. An apparatus for wireless communication at a user equipment (UE), comprising:
means for measuring, for one or more antenna elements of a plurality of antenna elements at the UE, an amplitude of one or more reference signals received from an access network entity;
means for measuring a received power of the one or more reference signals for one or more phase shifter values of a plurality of phase shifter values applied to the plurality of antenna elements;
means for applying a set of amplitude weightings and a set of phase weightings to the plurality of antenna elements, wherein the set of amplitude weightings are based at least in part on the measured amplitudes and the set of phase weightings are based at least in part on the measured received powers; and means for receiving one or more downlink transmissions from the access network entity based at least in part on the set of amplitude weightings and the set of phase weightings applied to the plurality of antenna elements.

26. The apparatus of claim 25, wherein the set of phase weightings are determined based at least in part on one or more aperiodic reference signals transmitted by the access network entity.

27. The apparatus of claim 25, wherein the means for the applying the set of amplitude weightings and the set of phase weightings comprise:

means for applying a matrix of products of amplitude weightings and phase weightings to signals of each antenna, wherein the matrix is weighted based at least in part on a summation of the measured amplitudes.

28. A non-transitory computer-readable medium storing code for wireless communication at a user equipment (UE), the code comprising instructions executable by a processor to:

measure, for one or more antenna elements of a plurality of antenna elements at the UE, an amplitude of one or more reference signals received from an access network entity;

measure a received power of the one or more reference signals for one or more phase shifter values of a plurality of phase shifter values applied to the plurality of antenna elements;

apply a set of amplitude weightings and a set of phase weightings to the plurality of antenna elements, wherein the set of amplitude weightings are based at least in part on the measured amplitudes and the set of phase weightings are based at least in part on the measured received powers; and receive one or more downlink transmissions from the access network entity based at least in part on the set of amplitude weightings and the set of phase weightings applied to the plurality of antenna elements.

29. The non-transitory computer-readable medium of claim 28, wherein the set of phase weightings are determined based at least in part on one or more aperiodic reference signals transmitted by the access network entity.

30. The non-transitory computer-readable medium of claim 28, wherein the instructions to apply the set of amplitude weightings and the set of phase weightings are executable by the processor to cause the apparatus to:

apply a matrix of products of amplitude weightings and phase weightings to signals of each antenna, wherein the matrix is weighted based at least in part on a summation of the measured amplitudes.

* * * * *